G. J. BARRETT.
TYPE WRITING AND COMPUTING MACHINE.
APPLICATION FILED DEC. 14, 1910.

1,227,236.

Patented May 22, 1917.
15 SHEETS—SHEET 1.

WITNESSES:
E. M. Wells.
R. H. Strother.

INVENTOR:
Glenn J. Barrett
By Jacob Felbel
HIS ATTORNEY

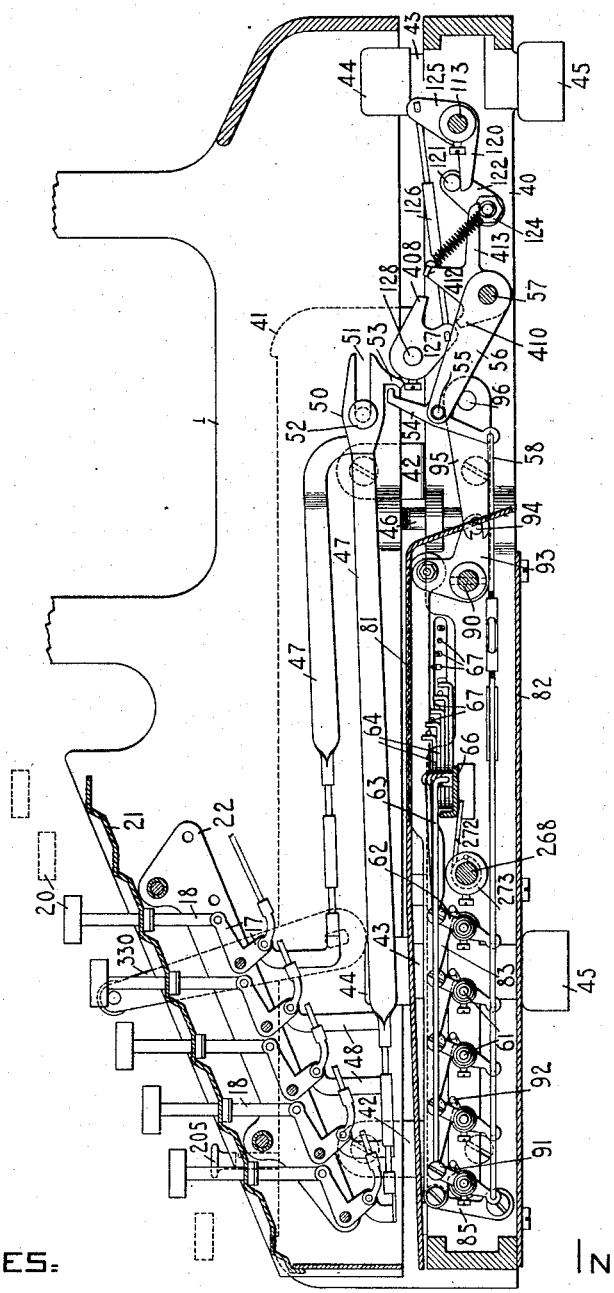

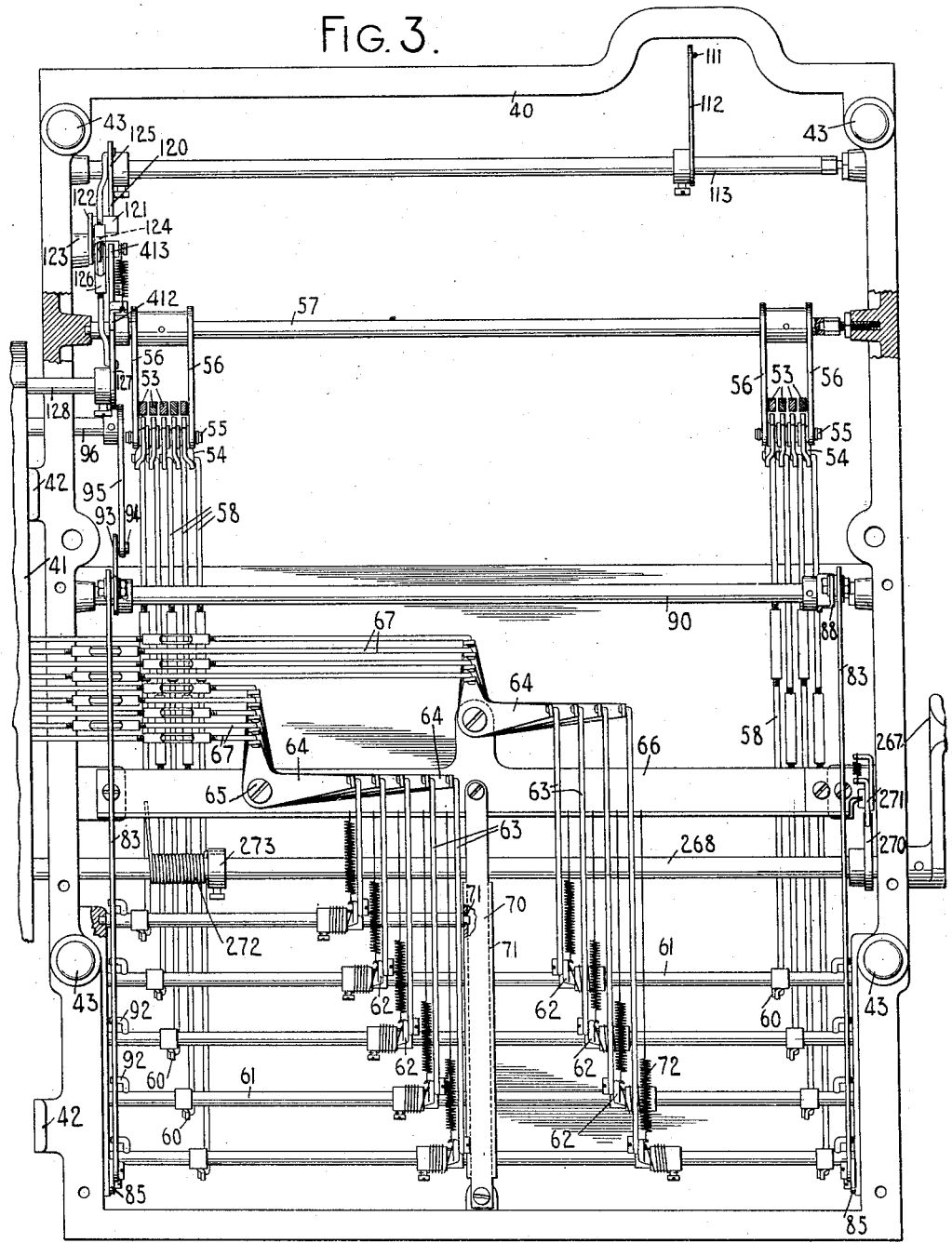

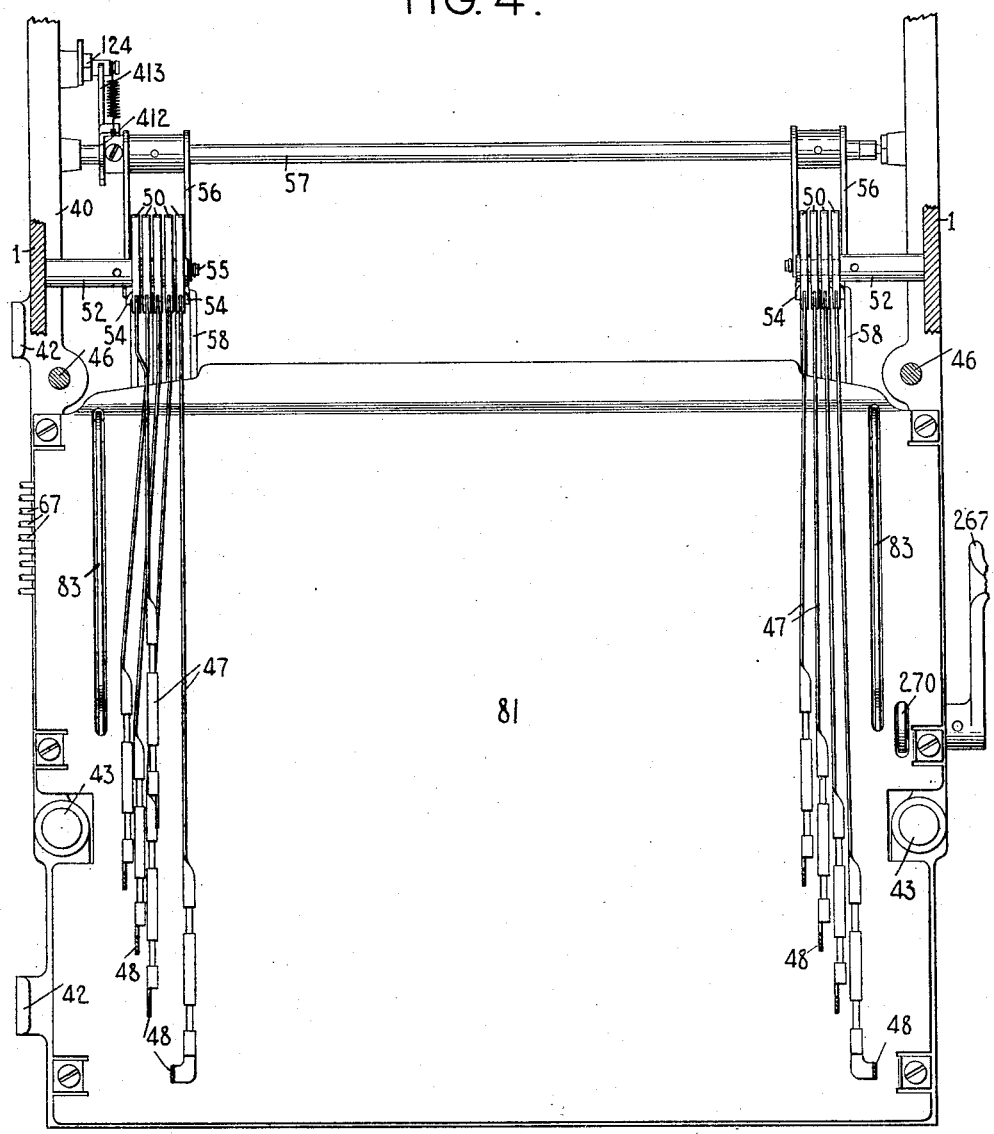

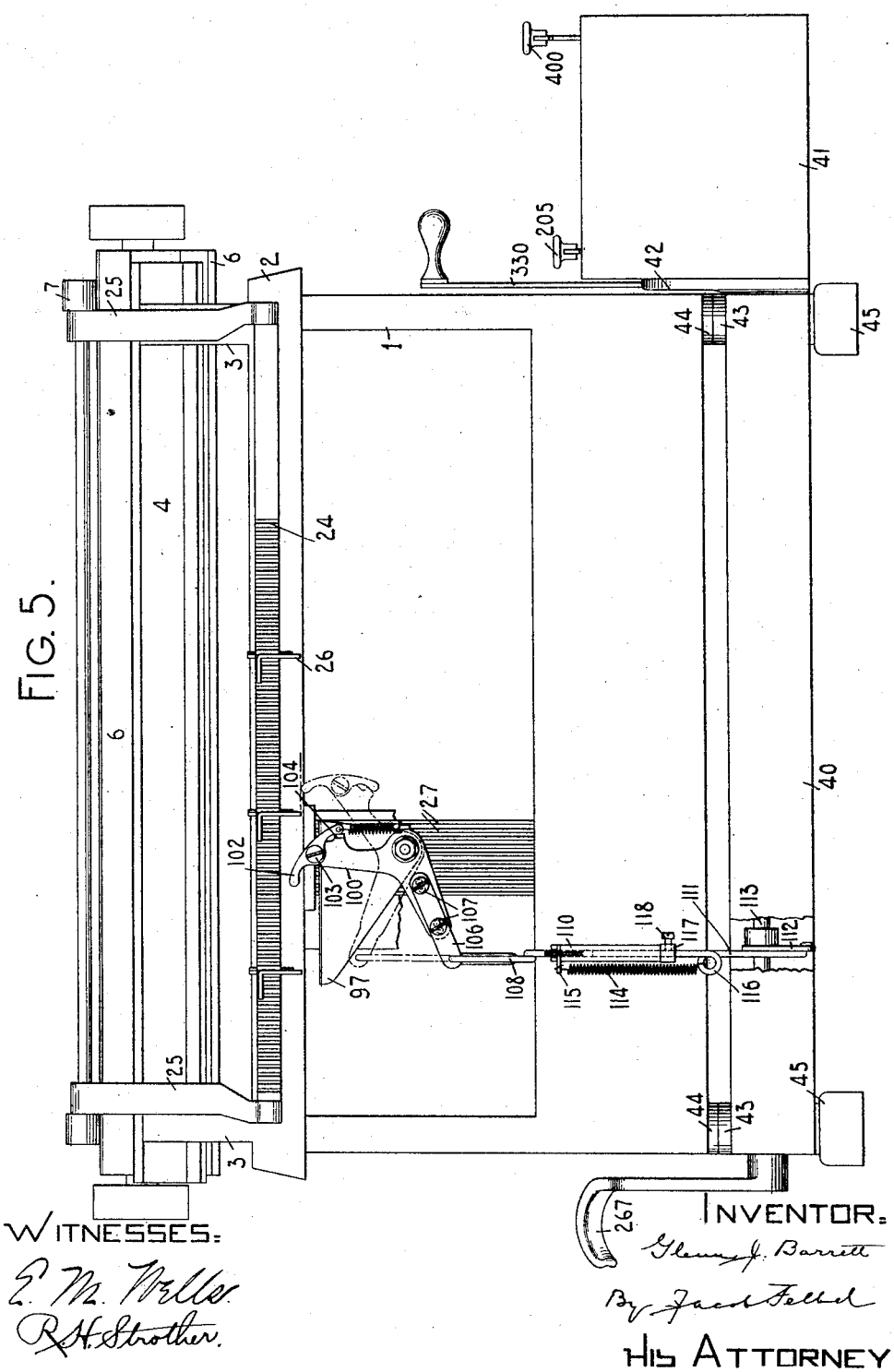

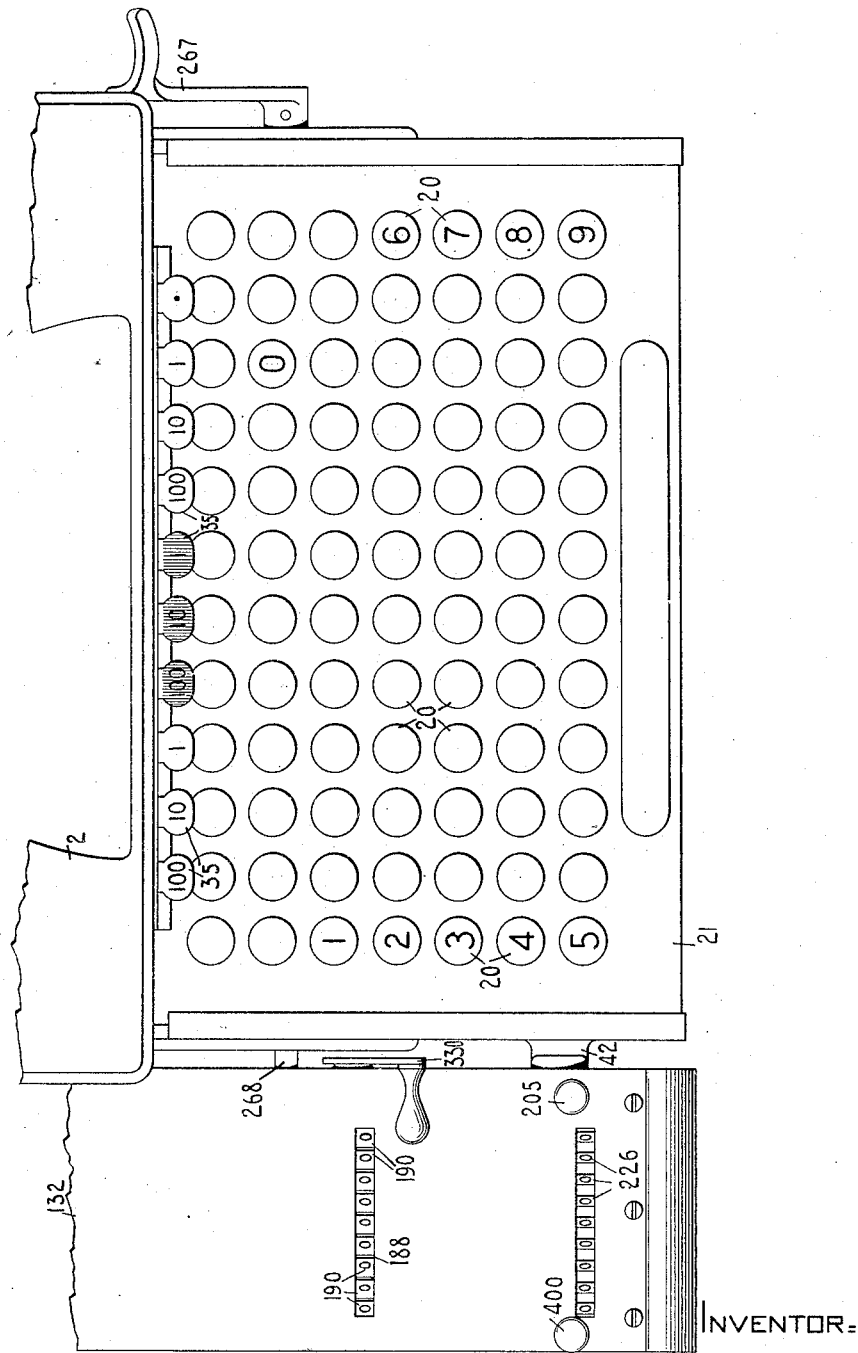

G. J. BARRETT.
TYPE WRITING AND COMPUTING MACHINE.
APPLICATION FILED DEC. 14, 1910.
1,227,236.
Patented May 22, 1917.
15 SHEETS—SHEET 7.
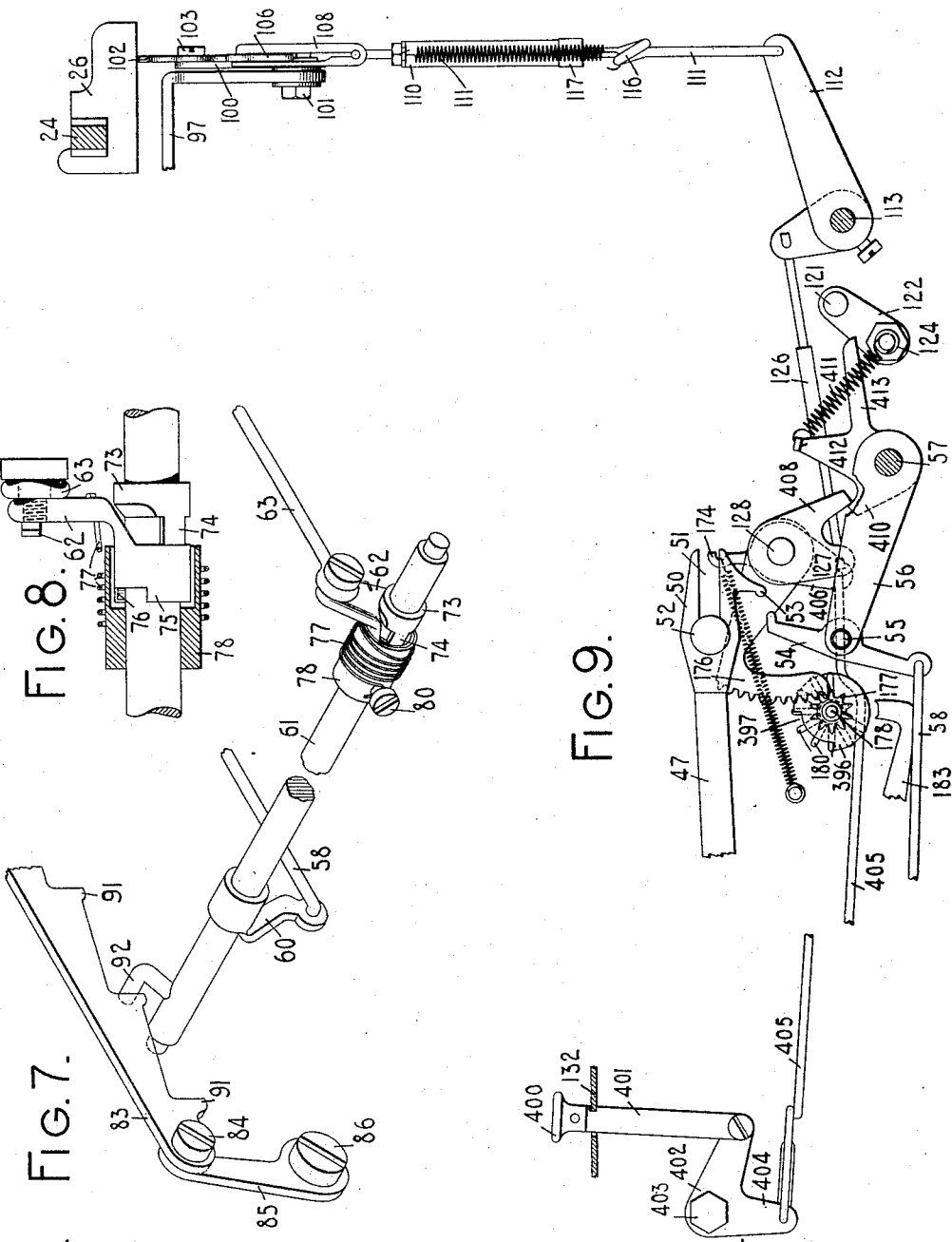

G. J. BARRETT.
TYPE WRITING AND COMPUTING MACHINE.
APPLICATION FILED DEC. 14, 1910.

1,227,236.

Patented May 22, 1917.
15 SHEETS—SHEET 8.

WITNESSES:
E. M. Wells
R H Strother

INVENTOR:
Glenn J Barrett
By Jack Feldl
ATTORNEY

G. J. BARRETT.
TYPE WRITING AND COMPUTING MACHINE.
APPLICATION FILED DEC. 14, 1910.

1,227,236.

Patented May 22, 1917.
15 SHEETS—SHEET 10.

WITNESSES:
E. M. Wells
R. H. Strother

INVENTOR:
Glenn J. Barrett
By Jacob Felbel
HIS ATTORNEY

G. J. BARRETT.
TYPE WRITING AND COMPUTING MACHINE.
APPLICATION FILED DEC. 14, 1910.

1,227,236.

Patented May 22, 1917.
15 SHEETS—SHEET 11.

WITNESSES:

INVENTOR:
HIS ATTORNEY

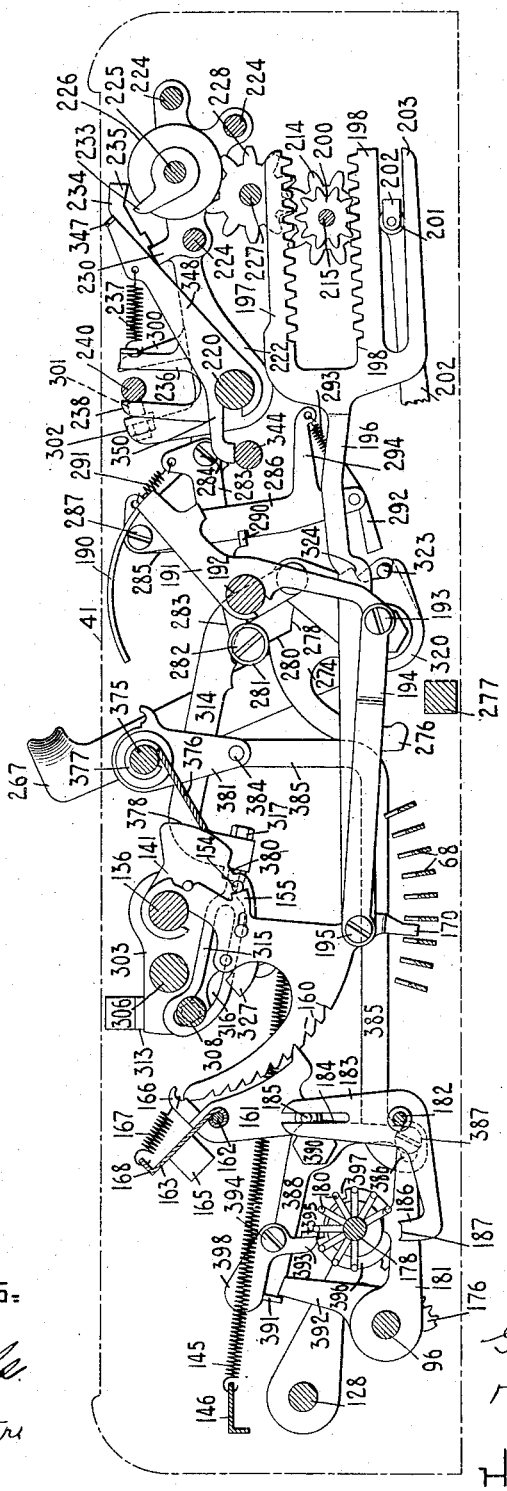

G. J. BARRETT.
TYPE WRITING AND COMPUTING MACHINE.
APPLICATION FILED DEC. 14, 1910.
1,227,236.
Patented May 22, 1917.
15 SHEETS—SHEET 13.
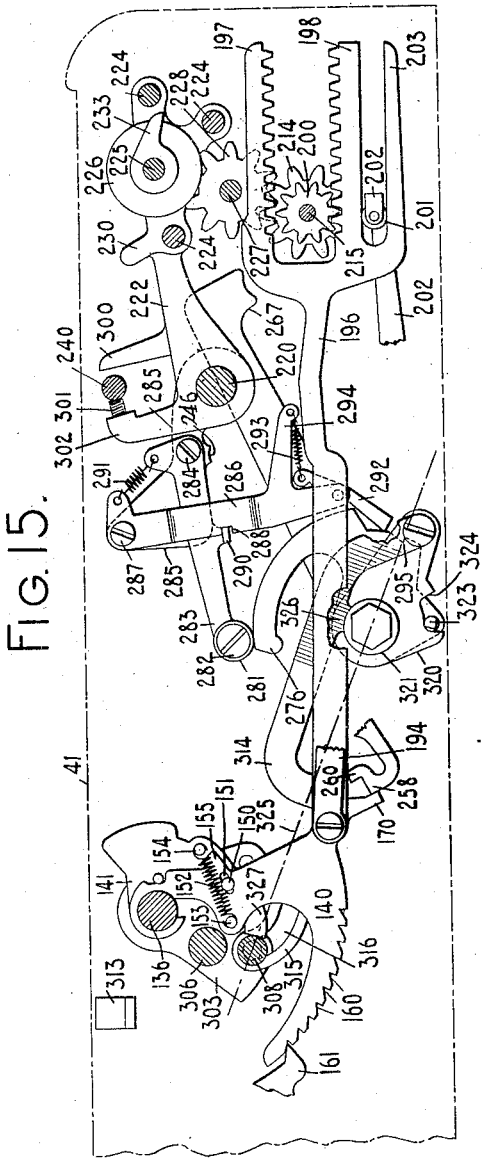
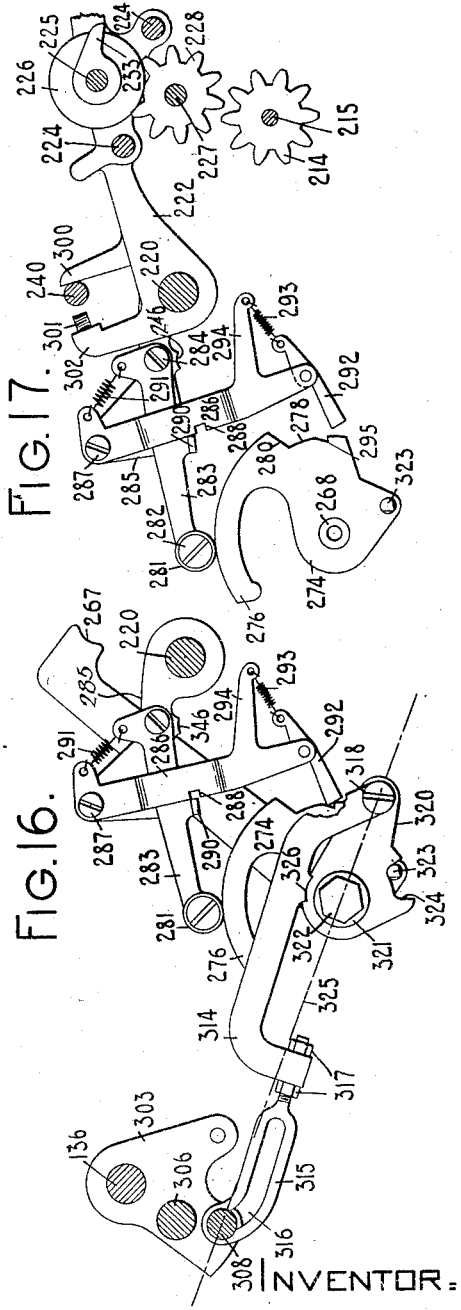

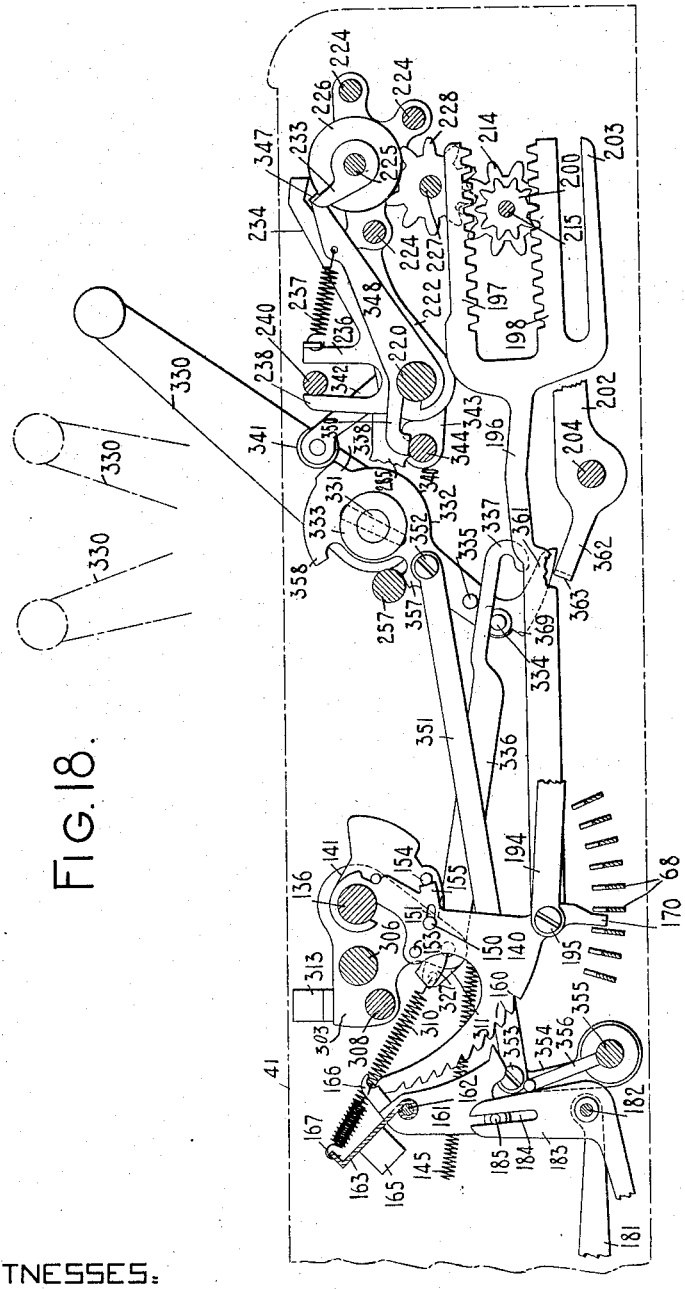

G. J. BARRETT.
TYPE WRITING AND COMPUTING MACHINE.
APPLICATION FILED DEC. 14, 1910.

1,227,236.

Patented May 22, 1917.
15 SHEETS—SHEET 15.

WITNESSES:

INVENTOR:

HIS ATTORNEY

UNITED STATES PATENT OFFICE.

GLENN J. BARRETT, OF GRAND RAPIDS, MICHIGAN, ASSIGNOR, BY MESNE ASSIGNMENTS, TO REMINGTON TYPEWRITER COMPANY, OF ILION, NEW YORK, A CORPORATION OF NEW YORK.

TYPE-WRITING AND COMPUTING MACHINE.

1,227,236.      Specification of Letters Patent.      Patented May 22, 1917.

Application filed December 14, 1910. Serial No. 597,354.

*To all whom it may concern:*

Be it known that I, GLENN J. BARRETT, citizen of the United States, and resident of Grand Rapids, in the county of Kent and State of Michigan, have invented certain new and useful Improvements in Type-Writing and Computing Machines, of which the following is a specification.

My invention relates to computing machines and also to combined typewriting and computing machines.

My invention has for its principal object to provide an improved computing attachment for a typewriting machine, or an improved combined computing and typewriting machine, by means of which numbers can be written in connection with any ordinary words after the ordinary fashion of typewriting and computations such as addition and subtraction can be automatically performed with the numbers written on the typewriter.

My invention includes numerous improvements both in the computing mechanism itself and in the connections between said computing mechanism and the typewriting mechanism; and many or all of the improvements in the computing mechanism may be applicable to computing machines in which there is no connection with typewriters.

My invention consists in certain features of construction and combinations and arrangements of parts, all of which will be fully set forth herein and particularly pointed out in the claims. In some respects the present invention is in the nature of an improvement on, or a development of, that set forth in my prior application, Serial No. 532,889, filed December 13, 1909; and said prior application contains claims that read on the construction shown and described in the present application.

In the accompanying drawings,

Fig. 2 is a front to rear vertical section of the same but with some parts shown in Fig. 1 omitted and looking in the opposite direction from Fig. 1.

Fig. 3 is a top plan view, partly in section and with parts broken away and parts removed, showing some of the mechanism that lies beneath the typewriting machine, this mechanism consisting for the most part of various connections from the typewriting machine into the computing machine.

Fig. 4 is a view similar to Fig. 3 but showing some of the parts which were omitted or sectioned away in said Fig. 3.

Fig. 5 is a rear elevation.

Fig. 6 is a top plan view of the forward parts of the combined typewriting and computing machine.

Figs. 1 to 6 inclusive are on a reduced scale and they show only so much of the typewriting mechanism as is necessary to an understanding of the present invention.

Fig. 7 is an enlarged isometric view of part of the connections from one of the keys and showing also part of a certain universal bar.

Fig. 8 is a view still more enlarged of certain details in said key connections.

Fig. 9 is a view in side elevation of the connections from the typewriter carriage to the denomination selecting devices of the computer and of some of the key connections, the parts being shown in the positions they occupy when the computer is disconnected by a certain key from the typewriting mechanism.

Figure 10:
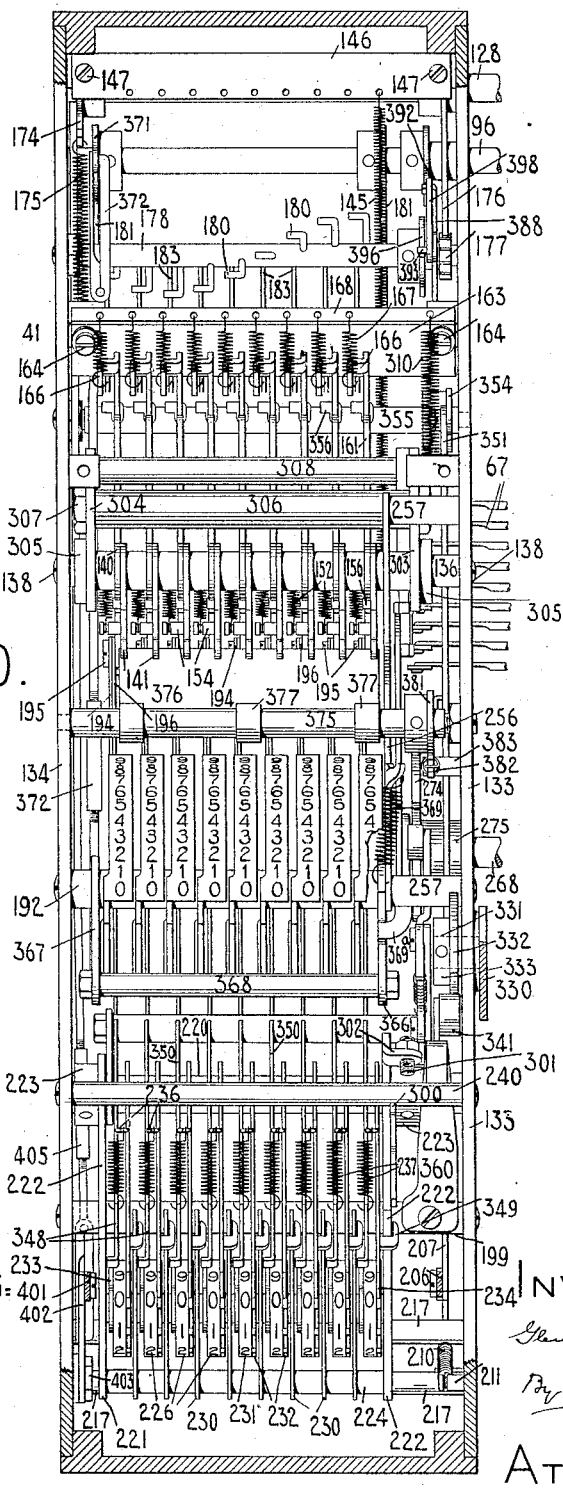

Fig. 10 is a top plan view of the computing mechanism with the top plate of the casing removed and with some parts in section, some broken away and some omitted.

Figure 11:
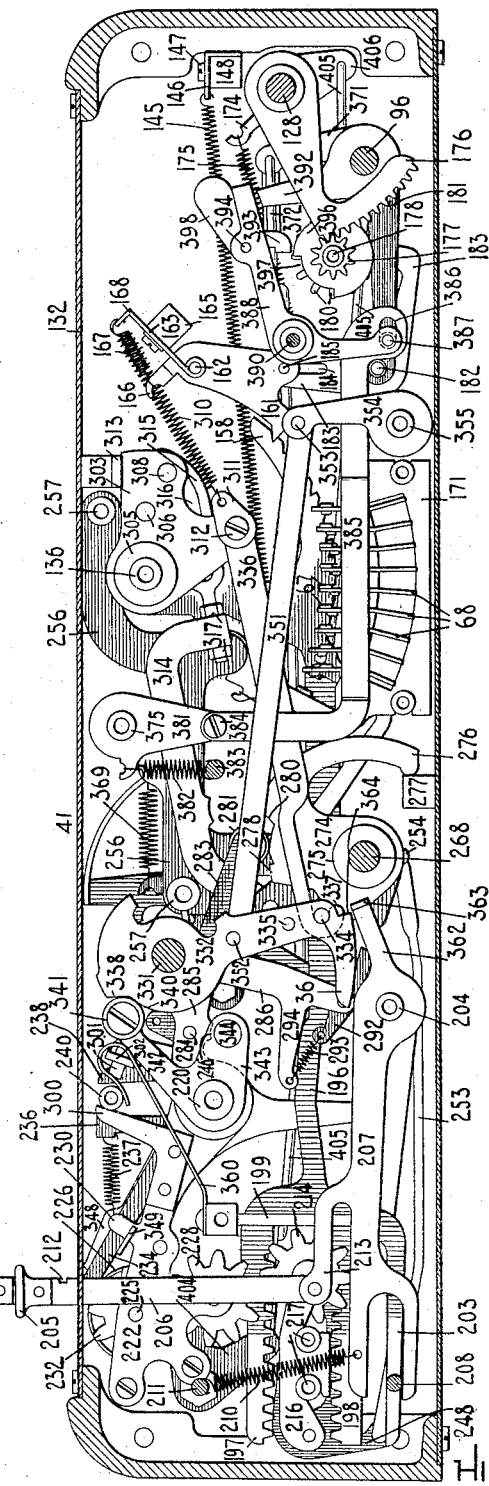

Fig. 11 is a right-hand side elevation of the computing mechanism in section just inside the right-hand plate of the computer casing.

Figures 12, 21:
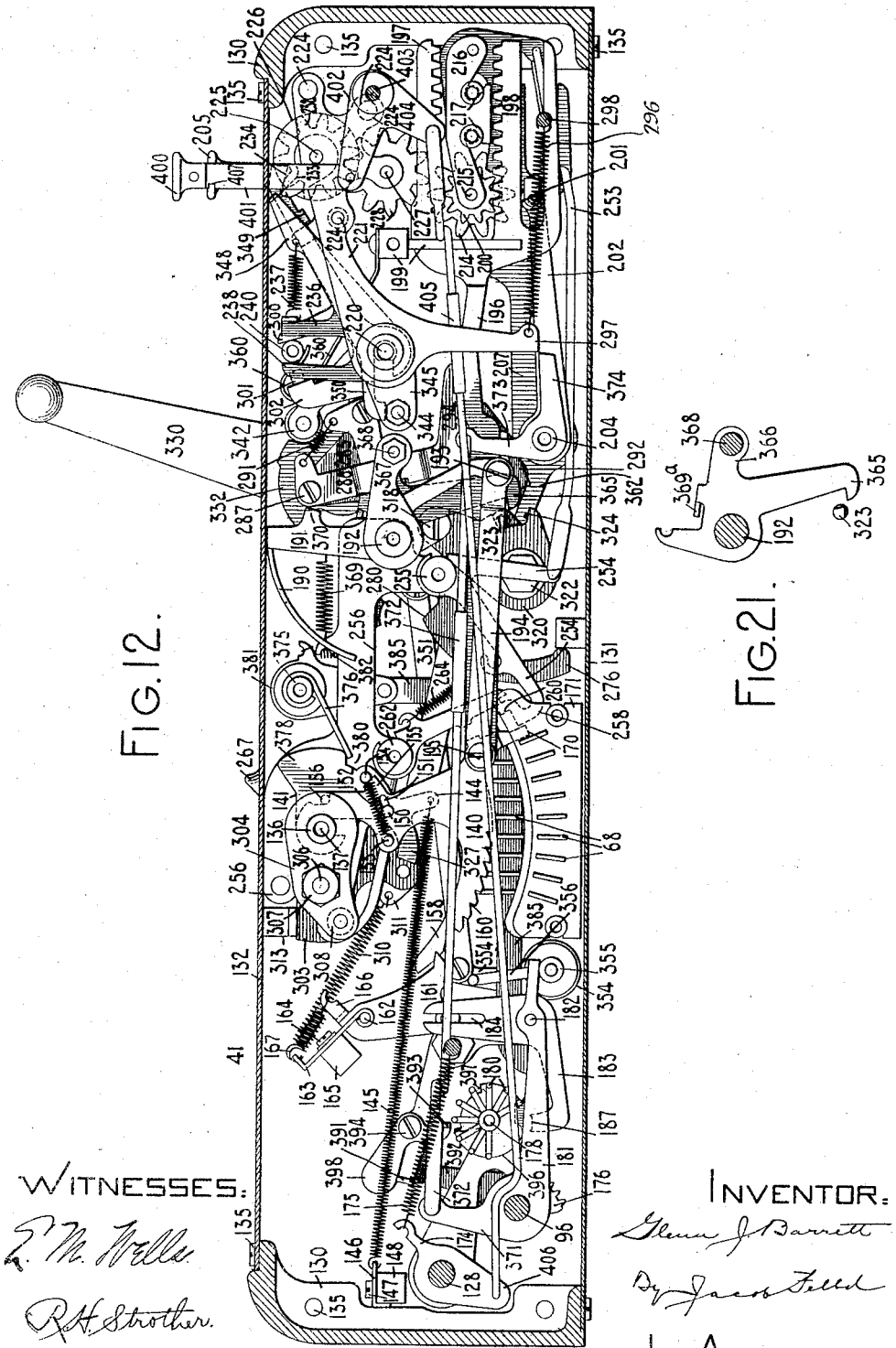

Fig. 12 is a left-hand side elevation of the same in section just inside the left-hand plate of the computer casing.

Figure 13:
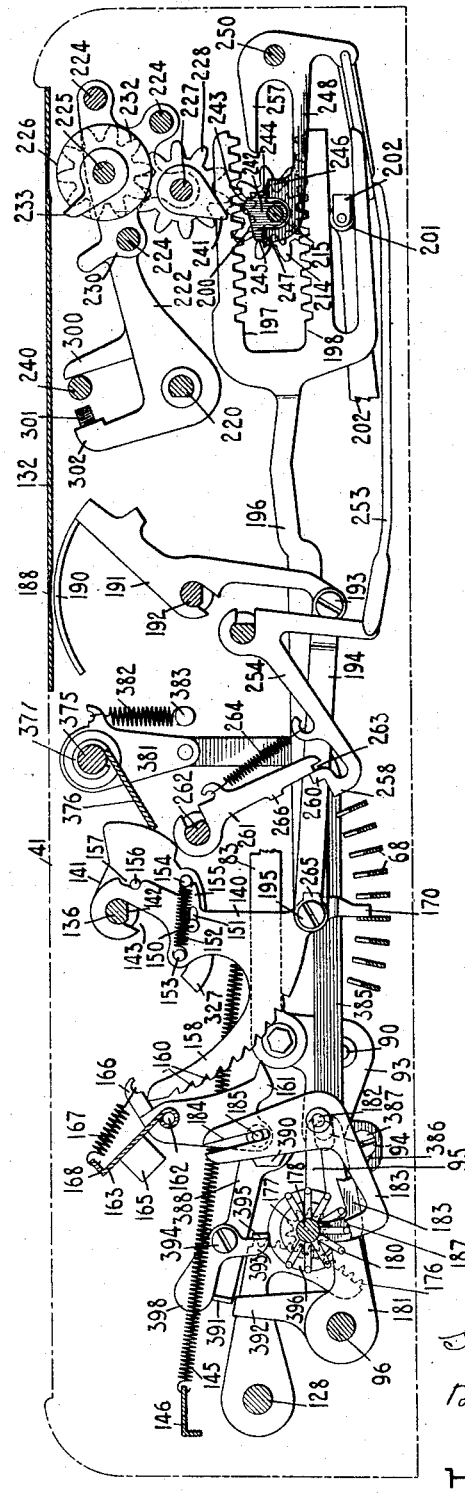

Fig. 13 is a right-hand side elevation of one complete set of denominational devices and some of the associated parts; that is to say, this view shows the differential devices, the indicator, the register wheel and various connections of one denomination besides some of the coöperating parts of the machine, the parts being shown in the position they occupy during the depression of a key to set up a digit in that denomination.

Fig. 14 is a similar view but showing some of the operating mechanism and showing the parts in the position they occupy at a certain point early in the forward stroke of the operating handle.

Fig. 15 is a view somewhat similar to the parts of Fig. 14, but with the operating handle at the extreme end of its forward stroke.

Fig. 16 shows some of the same parts of the operating mechanism as Figs. 14 and 15 but with the operating handle on the return stroke and in position where the register frame is just about to be tripped off.

Fig. 17 shows the same parts an instant later with the register frame elevated to its normal position.

Fig. 18 is a vertical section through the computing mechanism designed to illustrate the correcting and resetting mechanism. The parts are shown in full lines with the resetting handle drawn forward to reset the register wheels to zero.

Figure 19:
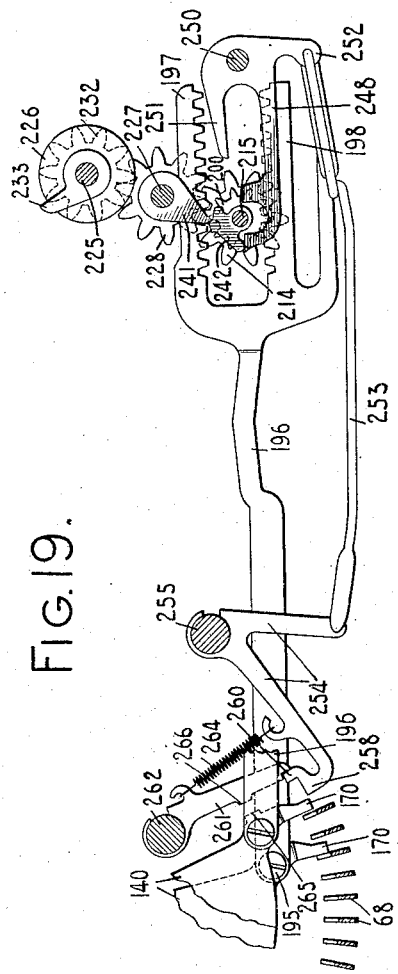

Fig. 19 is a left-hand side elevation of part of the computing mechanism and illustrating the operation of transferring.

Figure 20:
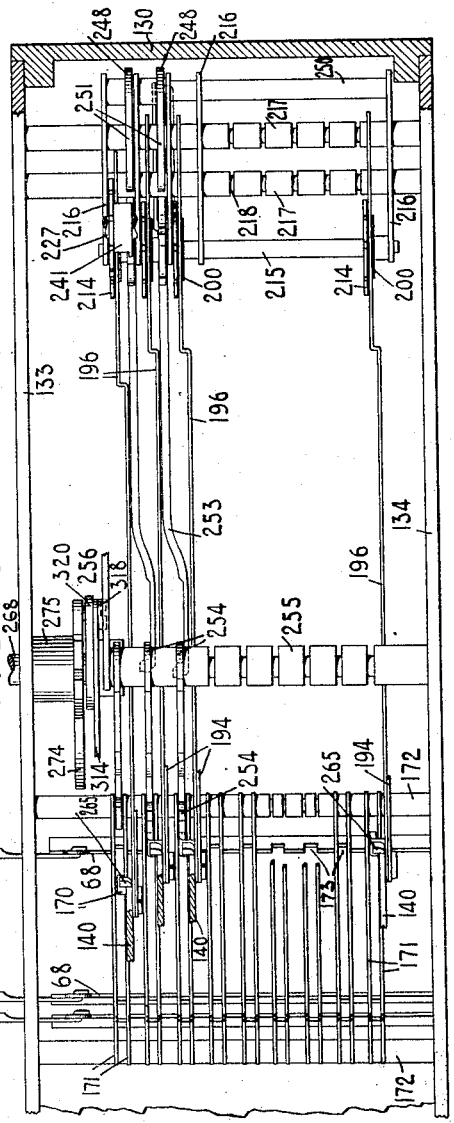

Fig. 20 is a top plan view of part of the computing mechanism.

Fig. 21 is a detail side elevation showing a certain locking device.

Figs. 9 to 21 inclusive are drawn to natural size. In most of the views parts have been omitted.

I have here shown my computing machine in connection with a Smith Premier No. 10 typewriter, although by simply modifying the form of the connections said computing machine is capable of combination with other sorts of typewriters. The Smith Premier No. 10 typewriter is well known in the art and I have not deemed it necessary to illustrate all the parts of the machine in detail but have shown only enough to make plain the manner in which the computing mechanism is combined with it.

The main frame of the typewriter comprises a side plate 1 and a top plate 2. Standards 3 rising from said top plate support a stationary carriage rail 4 which is suitably grooved on its opposite edges to coöperate with anti-friction balls 5 which run in grooved bars or rails 6 constituting part of a carriage 7 having a platen 8 mounted thereon. Front strike type bars 10 are mounted on segments 11 and they carry types 12 which are adapted to strike at a common printing point on the front face of the platen 8. The type bars are operated through a chain of connections including radiating links 13 and radiating sub-levers 14, the last pivoted on a sub-lever segment 15 and connected by links 16 with bell-crank key levers 17 to which are pivoted the lower ends of the stems 18 of printing keys 20. The key stems 18 pass through a keyboard plate 21 and the key levers 17 are supported by a suitable frame 22. The sub-levers 14 are provided with returning springs 23.

The carriage 7 is fed toward the left by a spring drum which is not shown, and the motion of said carriage is controlled by an escapement which may be of any suitable construction. The escapement actually employed in the machine shown in the drawing is substantially like that shown in the British patent to Alexander T. Brown, No. 4810 of 1907. The type and key actions briefly described above, are substantially the same as those set forth more fully in the British patent to Fell, No. 15,029 of 1906.

The typewriting machine is preferably equipped with a denominational tabulator as the use of such a device greatly facilitates the writing of numbers in columns. This tabulator, so far as my invention is concerned, may be of any suitable construction but the one shown in the drawings is substantially like that shown in the patent to Alexander T. Brown, No. 939,587, dated November 9th, 1909. A column stop bar 24 is supported on arms 25 that extend downward from the rear part of the carriage, said column stop bar being formed on two of its opposite faces with slots spaced a letter space distance apart for the insertion of column stops 26. The construction is such that one of these stops can be inserted in any desired pair of transverse slots so as to arrest the carriage at any desired letter space position. Coöperating with the column stops 26 is a series of denominational stops 27, the upper ends of which are guided in a comb plate 28 suitably secured to the top plate 2. At their lower ends the stop bars 27 are pivoted at 30 to a series of levers 31 which are pivoted at 32 to a cross bar 33 in the base of the typewriter. Said levers 31 have forwardly extending arms to which are pivoted the lower ends of the stems 34 of a series of tabulator keys 35, which keys are arranged in a row at the back of the printing keyboard of the machine. There is one key 35 for each denomination and when that key is operated the corresponding stop bar 27 is moved up into the path of the column stop 26 and is adapted to arrest the carriage in the corresponding denominational position. A universal bar 36 controlled by a spring 37 lies across the rear arms of the levers 31, and said universal bar operates a device for releasing the carriage from its step-by-step feed mechanism and allowing it to run free until it is arrested by the tabulator stops. All of this mechanism is more fully set forth in the Brown Patent, No. 939,587, above referred to.

Figure 1:
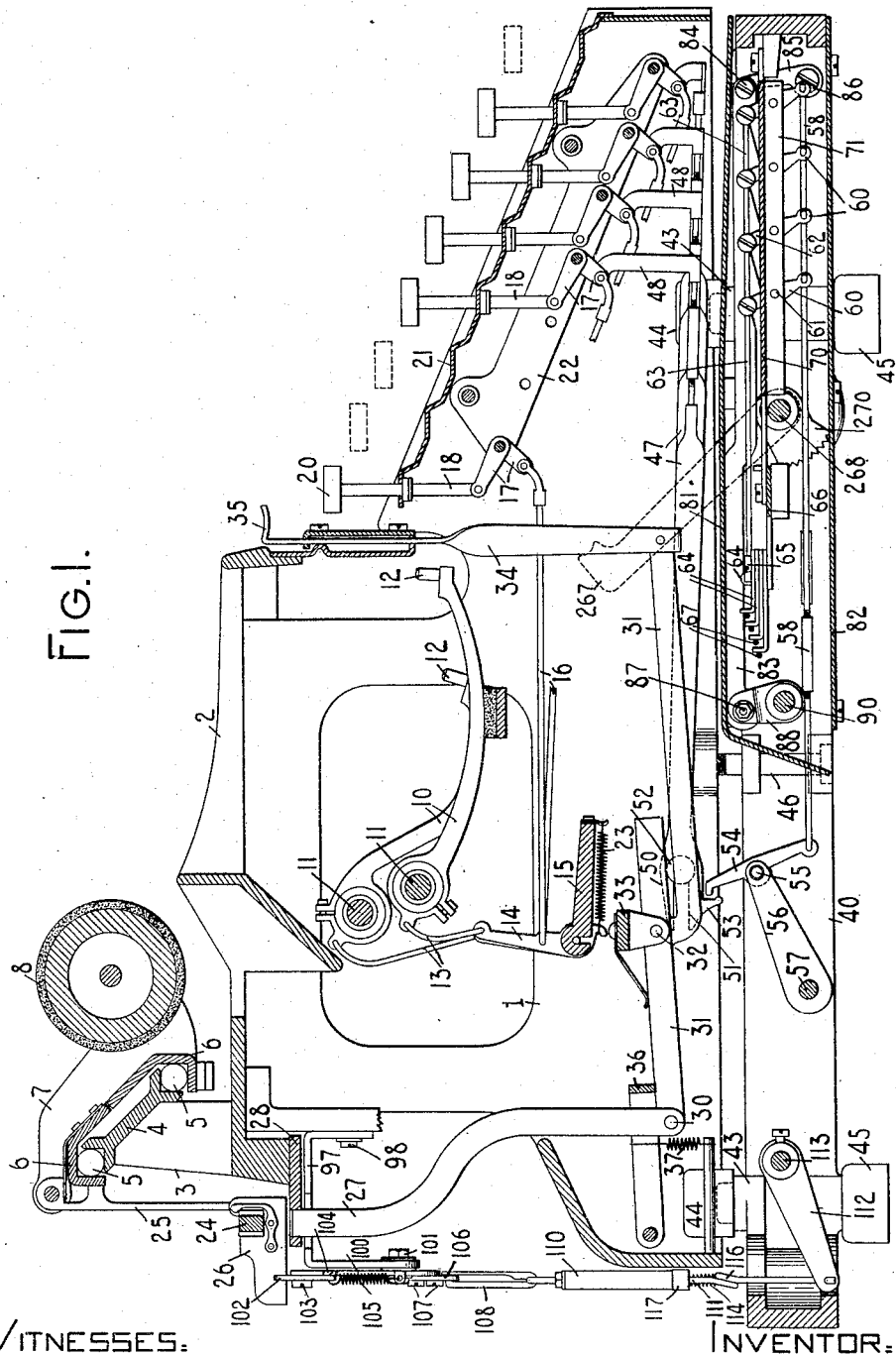
Figure 1 is a front to rear vertical sectional view of a combined machine having my invention embodied therein, the section being somewhat irregular but being for the most part about central of the typewriter.

Most of the computing mechanism and its connections are contained in a frame work or casing comprising two parts, one a broad, low base part 40 (Fig. 5) that lies beneath the typewriting machine or on which the typewriting machine is mounted, and a box-like casing 41 (Figs. 5 and 6) which is mounted at the left-hand side of the typewriting machine and is secured to the left-hand side of the base part 40 of the computer frame. The parts 40 and 41 are preferably made separately and are connected by means of brackets 42 projecting from the part 40 and to which the part 41 is secured by means of screws. The box-like part 41 contains most of the computing mechanism and the part 40 contains most of the connections to said computing mechanism from the typewriting machine. Said part 40 is formed with suitable posts 43 (Figs. 1 and 3) which project into the openings in lugs 44 of the typewriter frame, which openings ordinarily receive the rubber feet on which typewriters rest. The part 40 itself may rest on rubber feet 45 similar to those usually employed in typewriters. Two screws 46 (Fig. 1) pass upward through lugs of the frame 40 and are threaded into part of the typewriter frame, thus securing the two frames rigidly together but in such a way that they can readily be separated. In the machine as shown, the part 40 of the computing mechanism raises the typewriter about an inch and a half higher above the desk than it would be if it stood directly on the desk. As best shown in Figs. 1 and 3, the part 40 consists essentially of a rectangular frame having about the outline of the base of the typewriter.

As shown in Fig. 6, the numeral keys in this particular typewriting machine are arranged in two rows at the left and right-hand sides of the keyboard and my key connections have been arranged accordingly. The connections from the five left-hand numeral keys are shown in Fig. 5 and those from the four right-hand numeral keys are shown in Fig. 1; and all of them are shown in plan in Fig. 4. These connections comprise a series of links 47, each having at its forward end a vertical section 48 which is pivoted to the depending arm of one of the bell cranks 17 of the numeral keys. The links 47 extend from the keys toward the rear of the machine and at their rear ends said links are each thickened as shown in Fig. 4 at 50. Said thickened rear ends are formed with horizontal slots 51 through which pass two posts 52, one projecting from each of the side plates 1 of the typewriter frame, said posts supporting and guiding the rear ends of the links 47 in such a way that when any numeral key is depressed the corresponding link 47 has its rear end 50 moved directly toward the front of the machine. Each of said links has at its rear end a depending lug 53 which normally stands just back of the upper end of a lever 54 of the first order. There are nine of these levers 54, one for each of the links 47, and said levers are mounted in two sets at the left-hand and right-hand sides of the frame-part 40, each set being pivoted on a rod 55 supported by arms 56 projecting from a rock shaft 57 which is journaled at its ends in the two side plates of the frame 40. It will be understood that the links 47 are mounted on the typewriter and the levers 54 on the frame 40; and that the connection between said links and the levers is of such character as not to interfere with the lifting of the typewriter off of the frame. As far as the key connections are concerned, the typewriter can be put on or off at any time and whenever it is in position on the frame 40 the key connections are ready for operation without any special attention. As will appear more fully hereinafter the shaft 57 normally stands in the position shown in Figs. 1 and 2 but it can be rocked to the position shown in Fig. 9 to depress the levers 54 out of the paths of the lugs 53 so that the numeral keys are inoperative to rock the levers 54. The lower ends of the levers 54 have pivoted thereto links 58 which extend forward and at their forward ends are connected to arms 60 depending from horizontal transverse rock shafts 61 pivoted in the frame 40. Each of the shafts 61 has an upstanding arm 62 which is connected by a link 63 with a bell crank 64, pivoted at 65 on a cross bar 66 of the frame 40. Each of the bell-cranks 64 has a link 67 pivoted thereto and extending outside of the casing 40 and into the casing 41 where it is connected to one of a series of stop slides 68 (Figs. 19 and 20). A horizontal frame bar 70 (Fig. 3) is mounted in the frame 40 and extends in a front and back direction and has two flanges 71 bent down therefrom on its right and left-hand edges and the shafts 61 are pivoted at their inner ends in these flanges, said shafts being pivoted at their outer ends in the side plates of the frame 40. Said shafts and the whole train of key connections from the levers 54 to the slides 68, are restored to normal position by springs 72, each connected at one end to one of the arms 62 and at the other end to the cross bar 66. There are five rock shafts 61 on the left of the bar 70 and four on the right as shown in Fig. 3 and all of the five bell cranks 64 pertaining to the left-hand digits are arranged one on top of another on the same pivot screw 65 and the four bell-cranks 64 pertaining to the other four digits are similarly disposed. The arrangement is such that the slide 68 nearest the front of the machine corresponds with the digit "1" and the succeeding slides correspond regularly to the other digits, the "9" slide being the rearmost one. As the slide 68 has a limited extent of movement and it is not desired to have the key positively arrested, I have provided in the chain of connections between the keys and slides, a series of yielding connections, said yielding connections being located in the present instance between the shafts 61 and the arms 62. These connections are illustrated in detail in Figs. 7 and 8. 73 represents a collar tight on the shaft 61 and having two lugs or projections 74 extending lengthwise of said shaft and abutting the hub 75 of the arm 62, said hub being loosely mounted on the shaft and being prevented from motion toward the right thereon by means of the projections 74. A pin 76 projects from the shaft into a cutout in the hub 75, said cut-out permitting a limited rotation of the shaft independently of the hub. The arm 62 is drawn forward as far as permitted by the pin 76 by means of a spring 77 connected at one end to the arm 62 and at the other to a collar 78 around which said spring is wound and which is rigidly mounted on the rock shaft by means of a set screw 80. The construction is such that when the shaft begins to turn the arm 62 is drawn along with it by means of the spring 77 but when the slide 68 reaches the limit of its motion, the shaft can turn independently of the arm 62 against the tension of the spring 77, the pin 76 moving in its cut-out in the hub 75. This connection enables the motion of the slide 68 to be definitely limited and prevents any straining of the parts. In the present instance, the motion of the slides 68 is limited by the side-plate of the casing 41 (Fig. 20).

The various links 58, 67, etc., are or may be provided with turnbuckles, as shown, for the purpose of adjusting their length.

I prefer to mount a cover plate 81 over the parts at the front of the frame 40 in order to protect them from dust; and another plate 82 is also mounted beneath said parts for similar purposes.

Two universal bars 83 are provided for the key operated parts, one of said universal bars being in position to be operated by the left-hand series of shafts 61 and the other by the right-hand series of said shafts. Each of said universal bars extends horizontally above the shafts and is mounted at its forward end by means of a pivot screw 84 on a guide link 85 pivoted on a screw 86 threaded into the frame 40. At their rear ends the bars 83 are pivoted at 87 to arms 88 projecting upward from a rock shaft 90 on which said arms are rigidly mounted so that said shaft is rocked whenever any one of the nine numeral keys is operated. The universal bars are formed on their under sides with teeth or projections 91 with which coöperate arms 92 mounted on the several rock shafts 61, the construction being such that the universal bar is moved toward the front of the machine when a key is depressed. At its left-hand end the shaft 90 has an arm 93 projecting therefrom toward the rear of the machine, and a pin 94 (Fig. 2) projects from said arm into a slot in the end of an arm 95 which is rigidly mounted on a rock shaft 96 that extends into the casing 41 where it operates devices to be hereinafter described.

The denomination selecting devices of the computer are controlled by the typewriter carriage and preferably through the column stops 26. A bracket 97 (Figs. 1 and 5) is secured to a part of the typewriter framework by means of screws 98 in a position adjacent the denominational stop bars 27. A bell crank 100 is pivoted on said bracket at 101 and has an upstanding arm to which a dog 102 is pivoted at 103. These parts are shown in normal position by solid lines in Fig. 5 and at the extreme limit of their motion under the impulse of the carriage by dotted lines in said Fig. 5. It will be seen that normally the dog 102 stands in the path of the column stops 26 and that, as the carriage moves toward the left of the operator, or toward the right as viewed in Fig. 5, the lever 100 will have its upstanding arm moved in the same direction. The dog 102 has an arm that is normally held against a lug 104 by means of a spring 105 connected to the lever 100 and to the dog so that when a column stop presses the dog toward the right in Fig. 5, said dog moves the lever with it; but in bringing the typewriter carriage back to begin a new line the column stops cross this dog in the opposite direction and said dog is turned about its pivot 103 out of the way of the column stops. The lever 100 has an arm 106 which, for the purpose of adjustment, is made in two sections connected together by screws 107 that pass through slots in the section 106 and are threaded into the section 100, the slots being elongated in the direction of the length of the arm so that the length of said arm can be regulated by loosening the screws 107 and sliding the section 106 one way or the other. This adjustment adapts my computing mechanism to typewriters of different styles of type and correspondingly different extends of letter-space feed of their carriages. Typewriting machines are arranged for various spacings, eight, ten and twelve letters to the inch being examples of spacings more or less commonly used in this country. A link 108 is pivoted to the free end of the arm 106 and the lower end of said link is threaded adjustably into a sleeve or tube 110. This sleeve has a hole extending the entire length thereof and only the upper part of said hole is threaded. A link or wire 111 has its upper end in the hole in the sleeve 110 and at its lower end said wire is pivoted to an arm 112 projecting from a rock shaft 113 in the frame 40. The wire 111 is loose in the tube 110 and it is drawn upward into said tube by means of a spring 114 connected at its upper end to a plate 115 projecting from the tube 110 and at its lower end said spring is connected with a loop 116 in the wire 111. The upward motion of the wire 111, under the impulse of the spring 114, is adjustably limited by a collar 117 which surrounds said wire and is secured in position thereon by a set screw 118, this collar normally contacting with the lower end of the tube 110. The parts 108, 110 and 111 normally move together as a single link, but in case the denomination selecting mechanism is arrested in this motion from any cause, the link 108 can move upward independently of the wire 111, stretching the spring 114, so that the parts will not be strained if the carriage comes against the dog 102 at a time when the shaft 113 is for any reason not free to turn. As best shown in Figs. 2, 3 and 9, the shaft 113 extends across the frame 40 and at its left-hand end has mounted thereon an arm 120 which coöperates with a stationary pin 121 mounted on an arm 122 which is rigidly secured to a lug 123 projecting from the frame 40 by means of a bolt or nut 124. The pin 121 constitutes a stop to limit the motion of the shaft 113 in one direction and said stop can be adjusted by loosening the nut 124 and turning the arm 122. The shaft 113 also has an upstanding arm 125 which is connected by means of a link 126 with an arm 127 secured to and projecting from a rock shaft 128 which extends into the casing 41 where it controls the denomination selecting devices as will presently be described. It will be seen that the shaft 128 is rocked whenever the lever 100 is rocked by the column stop 26.

The box-like casing or frame 41 comprises two end pieces 130 (Fig. 12) which are here shown as castings, a bottom plate 131, a top plate 132, a right-hand side plate 133 (Fig. 20) and a left-hand side plate 134, the front, bottom and side plates being secured to the end pieces 130 by screws 135. There are a number of stationary cross rods and other stationary parts in this portion of the machine which will be more specifically referred to in their proper order. In the present instance the casing plates, especially the side plates 133 and 134, are also utilized as frame plates to support the various parts of the mechanism.

The setting-up mechanism comprises certain devices which are pivoted on a stationary rod 136 (Figs. 10, 12 and 13). This rod, like some of the other stationary rods, has a hole 137 (Fig. 12) bored in each end of it and headed screws 138 passing through the side plates 133 and 134 are threaded into said holes and maintain the rod rigidly in place. Said rod is formed with a series of peripheral grooves as indicated in Fig. 13 and in each of said grooves two plates or levers 140 and 141 are pivoted side by side. As shown in Fig. 13 the reduced part of the rod is flattened on its under side at 142 and each of the plates is formed with an opening or slot 143 of a width a little less than the diameter of the round reduced part of the rod. The construction is such that the plates can be slipped over the rod when they are turned in such position that the slots fit on the flattened parts 142 of the rod; but when turned down into normal position the slots are not wide enough to permit of the plates being removed.

The shape of the plate 141 is best shown in Fig. 12 where it will be seen that said plate has a depending arm 144 to which is connected the forward end of a long coiled spring 145, the rear end of which is connected to a plate 146 secured at its ends by screws 147 to lugs 148 projecting from the side plates of the casing. The two plates 140 and 141 are connected together by means of a headed pin 150 projecting from the plate 141 through a slot 151 in the plate 142, said slot being so disposed as to permit of a limited amount of independent turning of the two plates about the rod 136. A spring 152 is connected at one end to a post 153 (Fig. 13) projecting from the plate 140 and at the other end said spring is connected to a post 154 projecting from the plate 141. The tension of this spring normally holds the pin 150 in the rear end of the slot 151. The relative motion of the two plates under the impulse of this spring, is limited by an ear 155 of the plate 140 striking the pin 154. Another pin 156, projecting from the plate 141, lies in a short cut-out 157 in the plate 140. The independent motion of these two plates has to do with the carrying or transfer operation, as will appear hereinafter.

Each of the plates 140 has an arc-shaped part 158 in the periphery of which is formed a series of ten notches 160 with which a pawl 161 coöperates. It is this pawl engaging the rearmost one of the notches 160 as shown in Fig. 12, that normally holds the parts against the tension of the spring 145. When said pawl is withdrawn the plates 140 and 141 are free to move toward the rear of the machine under the impulse of the spring 145 until arrested by one of the slides 68 or by other means. The whole series of pawls 161 are all pivoted on a rod 162 secured in the lower forward edge of a plate 163 which at its ends is secured by screws 164 to lugs 165 projecting from the side plates 133 and 134. The plate 163 is suitably slotted to accommodate and guide the pawls 161. Each of said pawls has an upstanding arm 166 which is off-set to one side in order to avoid interfering with the part 158 and to which is connected a controlling spring 167, all of said springs being connected at their rear ends to a flange 168 bent up from the plate 163.

In order to coöperate with the slides 68, each of the plates 140 is formed with a radial projection or extension 170. Said slides are arranged in a curved series having the rod 136 as a center, and they are mounted in suitable slots in plates 171 (Figs. 12 and 20) which in turn are mounted on transverse rods 172 which are secured at their ends to the plates 133 and 134. Each of the plates 171 has at each of its ends a slot, as shown in Fig. 12, and each of the rods 172 is formed with a series of peripheral grooves so that the rods can be inserted in the slots in the plates 171, which plates will be held in position by said peripheral grooves. As shown, there are two of these plates 171 for each of the plates 140 and each of the projections 170 is guided between said two plates. As shown in Fig. 20, each of the slides 68 is formed with a series of notches 173, one for each denomination, and these notches normally stand in the paths of the arms 170; but when one of the slides is moved longitudinally by the depression of a key, the projection between two of the notches comes in the paths of all of the arms 170 so that if any one of the plates 140 be released, it will be drawn back by its spring 145 and arrested in a position determined by which one of the nine slides has been operated.

The denomination selecting mechanism comprises means for withdrawing one of the pawls 161 when a numeral key is depressed and the typewriter carriage is in an adding column. As shown in Figs. 11 and 12 the rock shaft 128 which moves step-by-step with the typewriter carriage when the latter is passing through an adding column, has mounted thereon an arm 174 (Fig. 12) to which is connected one end of a spring 175, the other end of which is connected to a fixed part of the machine. It is this spring that restores the shaft 128 and the parts connected therewith to normal position, said parts being arrested in that position by the stop 121 (Fig. 2). Said shaft also has mounted thereon a gear segment 176 (Fig. 11) which meshes with a pinion 177 mounted on a shaft 178 journaled at its ends in the side plates 133 and 134. The shaft 178 has a series of pins 180 projecting therefrom and each at its outer end is bent off at right angles as shown in Fig. 10. There is one of these pins for each denomination and said pins are spirally arranged as shown in Fig. 10. As shown in Fig. 14 the series of pins does not extend entirely around the shaft but, on the contrary, there is a considerable angular space between the first pin and the last one. This shaft is shown in normal position in Figs. 12 and 14 and in that position the center of this open space is below the shaft and a little back of it. The parts are so proportioned that as the typewriter carriage moves step-by-step through an adding column, each step of the carriage turns the shaft 178 to an angular distance toward the front of the machine, equal to that between two consecutive pins 180.

It will be recalled that the shaft 96 is rocked toward the rear of the machine by the universal bars 83 at each depression of a numeral key. Inside the casing 41 said shaft has mounted thereon two arms 181 (Fig. 12) which extend toward the front of the machine and near their forward ends are connected by a cross rod 182, so that when a numeral key is depressed, said rod 182 is moved upward, as shown in Fig. 13. Suitably spaced apart on said rod is a series of levers or feelers 183, each having an upstanding arm formed with a long vertical slot 184 into which a pin 185 projects from the side of one of the pawls 161. Each of said levers also has an arm directed toward the rear of the machine, the rear end 186 of said arm being bent upward and formed with a shallow notch 187. The construction is such that when the shaft 96 is rocked the slot 184 permits the levers 183 to move upward, sliding idly over the pins 185; but if one of the pins 180 be standing over the upturned end 186 of one of said levers, that particular lever will have its rear end arrested and the upward motion of the pivot 182 will cause the forward arm of that lever to be rocked toward the rear of the machine, thus withdrawing that particular one of the pawls 161 to inoperative position and releasing the corresponding plate 140. The same key depression that has elevated the pivot 182 has also moved one of the slides 68 so that the released plate 140 will be arrested by said slide. The plate 140 which is thus released and arrested will be selected by the position which the typewriter carriage occupies at the time; and the position in which it will be arrested, that is to say, the extent of motion that will be imparted to it, will depend upon which numeral key was operated at the time. The plate 140 corresponding in denominational value to the position of the typewriter carriage, will thus be set back a number of notches 160 corresponding to the numerical value of the operated key. The position of the parts when a key is depressed is shown in Fig. 13 which shows the mechanism in the act of setting up the number "60,000". When the key is released the pawl 161 moves back into engagement with the segment 158 and the slide 68 is restored to normal position, the parts then standing as shown in Fig. 14 where it will be seen that the arm 170 has been allowed to drop on past the operated slide 68 and is held in a position between the sixth and seventh slides, thus leaving the slides free to be operated to set up a digit in another denomination.

As shown in Fig. 13, when a key is depressed and the carriage is in an adding zone, one of the feelers 183 is arrested by the appropriate one of the pins 180 and the remainder of said feelers move bodily upward. It will be seen that one of these feelers moves into the path of one of the pins 180 and thus is in position as long as the key is held down to prevent forward rotation of the shaft 178. This shaft therefore cannot turn as long as the key is depressed to a sufficient extent to bring one of the unobstructed feelers into the path of one of these pins. In many typewriting machines the carriage escapement is of such sort that the typewriter carriage begins its step to the next letter space position before the key is restored to normal position and in fact the escapement on the typewriter shown in the drawings is of this character. In that escapement the carriage is released practically at the same instant that the type strikes the paper. In some machines it is released before the type strikes the paper. The typewriter carriage is, however, free to begin its stepping motion in advance of the shaft 178 by reason of the yielding connection between the wire 111 and the tube 110. It will be seen that, even though the key is operated slowly and the carriage steps promptly, the carriage can make its step independently and the pin 180 that is obstructing one of the feelers 183, will not move away from said feeler and thus release the pawl 161 prematurely.

An indicator is provided to indicate to the operator what has been set up in the machine, said indicator being read through a slot 188 (Fig. 6) in the top plate 132. Said indicator can be best understood by reference to Figs. 10, 13 and 14. A series of arc-shaped indicator plates 190 which lie directly beneath the opening 188, consist of strips of sheet metal bent off from levers 191 which are strung on a frame rod 192 secured at its ends in the side plates of the casing 41. This rod is formed with a series of peripheral grooves, the bottoms of which are flattened and the levers 191 are slotted so that said levers are mounted on this rod in the same manner as the plates 140 on the rod 136. Each of the levers 191 has a depending arm which at 193 is pivoted to a link 194, the rear end of which is pivoted at 195 to the plate 140 of the same denominational value as that particular indicator segment. The parts or segments 190 have each the numerals from "0" to "9" inclusive printed on their upper faces and with the "0" normally showing through the slot 188. It will be seen that after a number has been set up on the machine, such number can be read through said slot by the operator.

The register is connected with the setting-up devices by means which include a series of bars 196, one for each denomination and each pivoted to one of the plates 140 on the same screw 195 that connects the links 194. Each of the bars 196 extends from said screw toward the front of the machine where it is forked, having at its forward end a rack 197 with downwardly facing teeth and beneath said rack a second rack 198 with upwardly facing teeth. The broadened forward ends of the bars 196 are guided by a comb 199 consisting of a series of pins projecting vertically downward from a cross bar which is secured at its ends to the side plates of the casing. Between the racks 197 and 198 there is situated a pinion 200 which is adapted to mesh with either one of said racks according as the bar 196 is raised or lowered. This raising or lowering of said bars is effected by devices including small rollers 201 each journaled in the forward end of an arm 202 and each of said rollers playing in a slot included between the branch 198 and another lower branch 203 of the same rack bar. All of the arms 202 are rigidly mounted on a rock shaft 204 which at its ends is mounted on pivot screws passing through the side plates 133 and 134. The shaft can be rocked to bring one or the other of the racks 197 and 198 into mesh with the pinion 200 by means of a key 205 (Fig. 11), the stem 206 of which passes down through a slot in the top plate 132 and is pivoted at its lower end to an arm 207 on said rock shaft 204. The motion of said arm and of the parts connected therewith, is limited by a stop pin 208 projecting from the side plate 133 into a suitable slot or opening in the forward end of the arm 207. This arm is controlled by a returning spring 210 connected to the arm and to a post 211 projecting from the side plate 133, said spring normally holding the arm in its upper position in which the machine is set for addition. When it is desired to use the machine for subtraction and for that reason to reverse the motion of the pinion 200, the key 205 can be pushed down and a notch 212 on the key stem can be hooked into engagement with the top plate 132 to hold the key down. In order to provide for some little elasticity in the connection between this key and the racks, the key stem is pivoted to a branch 213 of the arm 207, which branch is so formed as to have a certain amount of capability of flexure. This allows the notch 212 to hold the arm 207 down snug against the pin 208 without any very fine adjustment. This branch 213, however, does allow suitable adjustment by bending the arm.

The connections and mounting of the pinions 200 and associated parts will be best understood by reference to Figs. 11, 12 and 20. Each of said pinions is rigidly connected with a larger gear or pinion 214 and these double or combined pinions are mounted on a frame rod 215 which is supported by a series of separating plates 216 which in turn are supported by two frame rods 217 mounted in the side plates 133 and 134 and each formed with a series of peripheral grooves 218. The plates 216 are formed with open slots or notches as shown which fit into the grooves 218 so as to hold said plates suitably spaced apart and to support them rigidly. The frame comprising these rods 215 and 217 and the plates 216, also support certain parts of the transfer mechanism as will more clearly appear later on. The pinions 214 constitute drivers for the register wheels, which drivers can be operated in one direction for addition and in the other direction for subtraction.

The register is mounted in a swinging frame that can be moved down and up to bring the register wheels into and out of engagement with the pinions 214. Said frame comprises a rock shaft 220 pivoted at its ends on pivot screws threaded through the plates 133 and 134, and two arms 221 (Fig. 12) and 222 (Fig. 13) rigidily mounted on said shaft, the first near the right-hand and the other near the left-hand side of the casing 41 (Fig. 10). Said arms have hubs 223 rigidly mounted on the shaft. The arms 221 and 222 near their forward ends are connected by three frame rods 224 and also by a rod 225 on which the register wheels 226 are journaled and a fifth rod 227 on which are journaled a series of connecting gears 228. The rods 224 support a series of partition plates 230 (Figs. 10 and 13) which separate the devices for the several denominations. The whole constitutes a rigid frame for supporting the register wheels.

Each of the register wheels consists of a numbered disk 231, a gear or pinion 232 and a plate or arm 233 all rigidly connected together in any suitable manner and constituting one rigid part that is rotatable on the rod 225. The gear 232 is in constant mesh with the transmitting gear 228; and the arm or plate 233 is used in connection with other devices to be later described for setting the register to zero.

The register wheels are normally held against rotation by a series of detents 234 (Figs. 14 and 18) pivoted on the rock shaft 220 and each formed at its forward end with a pointed nose 235 adapted to engage between two teeth of the register pinion 232. Each of the detents 234 has an upstanding arm 236 to which is connected a spring 237 that tends to pull the detent into engagement with the register wheel; and each of said detents has another upstanding arm 238 in a position to contact with the rear side of a stationary frame rod 240 which is secured in the side plates of the casing above the shaft 220. The construction is such that when the register frame is in its upper position shown in Fig. 12, the detents are pressed into engagement with the register wheels; but when said frame is depressed for the purpose of operating the register, the rod 240 prevents the detents from following the frame downward so that at the time when the register is being operated, it is free of the resistance due to said detents as shown in Figs. 14 and 18.

The transfer mechanism can be understood by reference to Figs. 13, 19 and 20. Each of the pinions 228 has mounted beside it and rigidly connected with it, a transfer tooth or tripper 241, which, as here shown, has a radius a trifle longer than that of said pinion. Loosely mounted on the rod 215 by the side of the pinion 200 is a trip or three-arm lever 242 having a squared shouldered arm 243 which, when the register is in its depressed position shown in Fig. 19, lies in the path of the tooth 241 and is adapted to be rocked by said tooth whether said tooth is turning one way or the other, it being understood that said tooth and the pinion 228 turn in one direction for addition and in the opposite direction for subtraction. The lever 242 also has a forward arm 244 and a rear arm 245 which lie respectively over branches 246 and 247 of an arm 248 of a lever which is pivoted on a frame rod 250. Said frame rod is mounted in the plates 216 in the same manner as the rod 215; but it stands in front of the rods 217 instead of behind them as does the rod 215. In order to avoid obscuring the drawings, the plates 216 and the transfer levers are not shown in Fig. 10 but are shown separately in plan view in Fig. 20. The upward motion of the lever 248 is limited by the trip piece 242 and the downward motion of said lever is limited by an arm 251 of the lever which lies above the rods 217, one of which limits the motion of this arm. Said lever also has a depending arm 252 to which is pivoted the forward end of a link 253, the rear end of which is pivoted to an arm of an angled lever 254. The series of levers 254 is pivoted on a peripherally grooved frame rod 255, said levers being mounted on this rod in substantially the same manner as the plates 140 on the rod 136. The operating mechanism to be later described, makes it inconvenient that this rod and certain others should reach clear across the machine to the frame plate 133. The rod is, therefore, supported at its left-hand end by the plate 134 and at its right-hand end by a special frame plate or bar 256, the outline of which can be traced in Figs. 11 and 12. Said frame plate is supported from the right-hand casing plate 133 by means of studs or posts 257 (Figs. 10 and 11). It is this plate also that supports the right-hand end of the rod 192 on which the indicator segments are mounted.

Each of the levers 254 has an arm that extends downward and toward the rear and which, at its free ends, constitutes a stop 258 that normally stands in position to limit the forward motion of the arm 170 of the plate 140 as shown in Fig. 12. When the trip lever 242 is rocked in either direction by the tooth 241, the lever 248 is operated as indicated at Fig. 19 and the forward arm of the lever 254 is drawn toward the front and the rear arm of said lever is drawn down to the position shown in said Fig. 19 and in which the stop shoulder 258 is withdrawn from the path of the arm 170, so that said arm is free to move farther toward the front. This additional forward motion is limited to a single unit or increment by a lug 260 on the lever 254, which lugs, when the lever is depressed to the position shown in Fig. 19, stands in the path of the arm 170. When the lever is moved to this position it is held in said position by a detent 261 pivoted on a rod 262 which is supported at its ends by the frame plates 134 and 256. Said detent is formed at its free end with a notch 263 for engagement with the lug 260. The lever 254 and the detent 261 are both controlled by a spring 264 which connects them, said spring tending to draw said detent to operative position and said lever to its normal position. After a number has been set up in the manner above described, it is added into the register by an operating mechanism to be hereinafter described. Among other functions said operating mechanism moves the plates 141 not only back to normal position but at least one increment beyond normal position; and said plates carry the plates 140 with them. If there is no transferring to be done each plate 140 is arrested by the stop portion 258 and the plate 141 moves on independently, stretching the spring 152. If there is a unit to be added by transfer in any particular denomination, the lever 254 of that denomination will be depressed and the plate 140 will move one unit's distance beyond its normal position until arrested by the lug 260, thus adding one in that denomination. When the plate 140 is thus moved an additional unit's distance, a lug 265 thereon strikes a projection 266 on the detent 261 and moves said detent toward the front of the machine out of engagement with the lug 260. The lever 254 is thus left free to move up against the end of the arm 170, a sufficient distance to prevent reëngagement of the detent; and when the arm 170 is finally restored to its normal position shown in Fig. 12, the lever 254 is drawn back to normal position by the spring 264. It will be perceived that the additional increment of motion is obtained whether the wheels be turning for addition or subtraction. It will, of course, be understood that each of the links 253 is connected at its rear end to a denominational device one space higher than at its forward end, as is shown in Fig. 20; that is to say, the lever 248 of the unit's wheel, for example, is connected by a link 253 with the lever 254 of the tens wheel.

The operating mechanism comprises an operating handle 267 situated at the right-hand side of the frame 40 and of the keyboard of the typewriting machine in a position to be operated by the right-hand, an operation of such lever consisting in drawing it forward to the limit of its motion and releasing it. Said handle is mounted on the right-hand end of a long shaft 268 which is journaled at its right-hand end in the frame 40 and extends on through into the casing 41, terminating a short distance inside the right-hand casing plate 133, as shown in Fig. 20. As shown in Figs. 1 and 3, the shaft 268 has just inside the frame plate 40 a toothed segment 270 with which coöperates a reversible pawl 271, these parts constituting a full stroke device. As this device is of ordinary construction I have not thought it necessary to illustrate it in detail. As shown in Fig. 3, said shaft is also provided with a returning spring 272 coiled about the shaft and connected at one end with a collar 273 mounted on the shaft, the other end of the spring being caught under the frame bar 66.

The means whereby the operating shaft 268 moves the register into and out of engagement with the gears 214, are best shown in Figs. 15, 16 and 17. Said means comprise a plate or cam 274, the position of which transversely of the machine is shown in Figs. 10 and 20 and the outline of which is best shown in Fig. 17. This plate has a hub 275 by which it is rigidly secured on the end of the shaft. The plate 274 has an arm 276, the periphery of which is in the arc of a circle about the axis of the shaft. The free end of this arm normally rests against a stop 277 (Fig. 11) to limit the return motion of the shaft 268 under the impulse of its returning spring. The disk also has another part 278 of circular outline and of less radius than the part 276 and these two parts are connected by a cam section 280.

The concentric parts 278 and 276 constitute dwells of a cam which includes the part 280, said cam coöperating with a follower roller 281 journaled on a pivot screw 282 threaded into the end of a lever arm 283, which, in turn, is pivoted at 284 to an arm 285 rigidly mounted on the shaft 220 of the register frame. It will be seen that the arm or lever 283 is not rigidly connected with the register frame by its pivot 284, but it is normally so connected by means of a latch lever 286 which is pivoted to the arm 285 at 287 and which has a notch 288 which normally engages over an ear or lug 290 bent off from the side of the lever 283. A spring 291 connects arms of the levers 283 and 286 and the tension of this spring is exerted to press the follower roller 281 toward its cam and to press the latch lever 286 into its operative position shown in Fig. 15.

In order to trip off the latch 286 and permit the register to return quickly to normal position in the first part of the return stroke of the operating handle, the lower end of the latch lever 286 has a pawl 292 pivoted thereto and controlled by a spring 293 connected at one end to the pawl and at the other end to an arm 294 of said latch lever. The free end of this pawl is adapted to be caught on the return stroke of the handle in a suitable notch 295 in the disk or plate 274.

These parts are shown in normal position in Fig. 11 where it will be seen that the roller 281 normally rests on the lower dwell 278 and the latch lever 286 is in its operative position shown more clearly in Fig. 15 than in Fig. 11. When the handle is drawn forward there is a short interval during which the roller 221 is not operated as will be understood from the lost motion shown in Fig. 11. When the incline 280 reaches said roller, the latter is elevated as shown in Fig. 14, which represents the parts at the instant when the follower 281 has reached the top of the incline 280 and where the register has been dropped down so that the pinions 228 engage the pinions 214. During the rest of the forward stroke the roller 281 runs on the dwell 276 and the parts now under discussion are stationary. When the handle 267 reaches the extreme forward part of its stroke, as shown in Fig. 15, it will be seen that the notch 295 is in position so that early in the return stroke of the handle, said notch will engage the pawl 292 as shown in Fig. 16 and force the latch lever 286 back until the notch 288 has passed out of engagement with the lug 290 when the register frame is released from the control of the follower 281 and arm 283. The register is then instantly thrown up to its normal position shown in Fig. 17 by means of a spring 296 (Fig. 12) which is connected to a depending branch 297 of the frame arm 221, the other end of said spring being connected to a post 298 projecting from one of the side plates of the casing. This spring normally holds the register in its upper and inoperative position. It will be seen that the register is depressed early in the forward stroke of the handle and is released and restored to normal position early in the return stroke of the handle.

The motion of the register frame under the impulse of the spring 296 is limited by an arm 300 which, as shown in Fig. 11, is riveted to the side of the arm 222 and which is adapted to engage the cross rod 240. The downward motion of the register frame is limited by a stop screw 301 adapted also to engage said cross rod as shown in Fig. 15. This stop screw is threaded through an ear bent off from an arm 302 constituting a branch of the frame arm 222.

The operation of adding a number on the register wheels consists in restoring the setting-up devices to normal position during the time when the register is in its depressed position; and in case of transfer of moving, on occasion, any of the setting-up devices one space beyond its normal position. The devices for effecting this operation comprise a frame pivoted on the rod 136 and suitably controlled by the operating handle. Said frame comprises a right-hand end plate 303 and a left-hand end plate 304, each of said end plates being provided with a hub 305 (Fig. 10) pivoted on the rod 136. The outline of the plate 303 can be seen in Fig. 18 which shows the plate in normal position and in Fig. 16 where it is in operated position, and the outline of the plate 304 is shown in Fig. 12. These two plates are connected together by a heavy cross bar 306 secured to the end plates by nuts 307. The plates are also connected by another cross bar 308 farther from the rod 136. The restoring frame is held in its normal position by a spring 310 (Fig. 11), one end of which is connected to a link 311 pivoted on a screw 312 that is threaded into the plate 303, the other end of said spring being connected, as shown in Fig. 10, to the plate 168. The motion of the restoring frame under the impulse of this spring is limited by stops 313 (Figs. 11 and 12) secured to the side plates of the casing.

The restoring frame is connected with the operating handle by means best shown in Fig. 16 and including a link 314 made in two sections, the rear section 315 having therein a long slot 316 that embraces a reduced part of the cross rod 308. The link section 315 is reduced at its forward end and threaded, said reduced end passing through a part of the forward section of the link and having nuts 317 for the purpose of adjusting the length of the link. The forward end of the link 314 is pivoted at 318 to a plate 320 which is pivoted on the extreme left-hand end of the shaft 268 between the plate 274 and a washer 321; which washer is secured in place by a screw 322 threaded into the end of the shaft. The plate 320 has freedom of motion with respect to the shaft, such freedom of motion being limited by a pin 323 projecting from the plate 274 into a notch 324 in the plate 320, all as clearly shown in Fig. 16. The parts normally stand in the position shown in Fig. 12 with the restoring frame in its rearmost position and with the pin 323 in the upper part of the notch 324 so that there is lost motion between the shaft 268 and the plate 320. The restoring frame therefore does not begin its forward motion until the operating handle has moved to the position shown in Fig. 14 where it will be seen that the said pin has just reached the bottom of the notch and the register frame has just been fully depressed into its operative position. In Figs. 15 and 16 I have drawn a line 325 through the centers of the rod 308 and the operating shaft 268 and it will be seen in Fig. 15 that at the extreme forward end of the stroke the link 314 has passed the dead center position so that the tension of the spring 310 would tend to carry the plate 320 downward. The parts are arrested in this position, however, by a stop lug 326 on the link 314 engaging the washer 321. The result is that when the operating shaft begins its return stroke the plate 320 remains in its operated position until the pin 323 has moved the length of the notch 324. This gives time for the register frame to be tripped off and restored to normal position while the restoring frame is still held in its extreme forward position. In Fig. 16, which represents the operating handle on its return stroke, it will be seen that the register has been tripped off and that the plate 320 has not yet passed the dead center on its return stroke.

The rod 308 when it is drawn forward comes against a series of arms or projections 327 on the plates 141 and presses said arms toward the front of the machine, carrying said plates 141 with them. The plates 141 carry the plates 140, the latter being drawn along by the springs 152. The extent of motion imparted to the plates 141 is more than enough to bring the arms 170 against the lugs 260 of the transfer levers. If, as shown in Fig. 15, there is no increment of motion by transfer in any particular denomination, the arm 170 is arrested by the stop 258 and the spring 152 is stretched, the pin 154 moving away from the lug 155 as shown in Fig. 15. If in that particular denomination there is an increment of motion by transfer, then the plate 140 is carried along with the plate 141 until the arm 170 is arrested by the lug 260.

The correction and resetting handle 330 (Figs. 10 and 18) is for the double purpose of making corrections in case a wrong number has been set up and of resetting the register to zero. This handle projects upward between the casing 41 and the typewriter casing. It is shown in Fig 18 in the position it occupies when resetting the register to zero, and it is shown in broken lines in two other positions. The middle one of the three positions shown is the normal position of this handle, and the handle is drawn forward as shown in full lines to reset the register to zero and it is pushed back to the rear one of the three positions shown to set the setting-up mechanism and indicator to zero without affecting the register. The handle 330 is mounted on a short rock shaft 331 suitably journaled in the frame plate 133 and inside of said plate said shaft is provided with a plate 332 having a hub 333 secured to the shaft, said plate 332 operating on all of the devices that are controlled by this handle. Said plate has a downwardly projecting arm from which project two pins 334 and 335, between which operates the forward end of a link 336 which at its rear end is pivoted on the same screw 312 that carries also the link 311 of the restoring frame for the setting-up devices. The link 336 is formed at its forward end with a hook 337 that hooks over the pin 334, the pin 335 being merely a guide pin to prevent the link from getting displaced from the pin 334. The parts are shown in normal position in Fig. 11 where it will be seen that the link 336 is so constructed as to permit of the restoring frame being drawn forward by the operating handle 267 without affecting the plate 332, said link then merely sliding over the pin 334; but if the resetting handle 330 be pushed toward the rear of the machine the pin 334 will move toward the front of the machine and will draw the restoring frame forward and reset all the setting-up devices to their zero positions. As the handle 330 does not in this operation move the register down into engagement with the pinions 214, this resetting of the setting-up devices does not affect the register. The forward motion of the restoring frame is permitted by reason of the long slot 316 in the link 314, so that the resetting of the setting-up devices by means of the handle 330 has no effect on other parts of the operating mechanism.

In order to set the register to zero, the plate 332 is formed with a cam 338 having a concentric part or dwell 340 on which normally rests a roller 341 journaled on the end of an arm 342 which is pivoted on the shaft 220 of the register frame. The roller 341 normally rests on the dwell 340 and the incline or cam part 338 is adapted to move the roller 341 upward and forward when the handle 330 is drawn toward the front of the machine, as shown in Fig. 18. As best shown in Fig. 11, the arm 342 is integral with another arm 343 to which is connected one end of a bar 344 which lies parallel with the shaft 220 just back of said shaft and is connected at its other end, as shown in Fig. 12, with another arm 345 pivoted on the shaft 220. The arms 343 and 345 and connecting bar 344 together constitute a bail or yoke frame that is pivoted on the shaft 220 and which is moved upward when the handle 330 is drawn forward. The arm 285, which it will be recalled is rigid with the register frame, is formed with a lug 346 that lies above the rod 344, as shown in Fig. 11, but with a little lost motion between the rod and the lug. The construction is such that when the handle 330 is drawn toward the front of the machine the rod 344 acting on the lug 346 rocks the register frame down into its operative position, as shown in Fig. 18.

The lost motion between the rod 344 and the register frame, is for the purpose of throwing in the stops which arrest the register wheels at zero. These stops consist of a series of ears 347 bent off from a series of levers 348 which are pivoted in parallel grooves in the shaft 220 and which are held up by the same springs 237 that control the detents 234. In other words, each of these springs 237 is connected at one end to one of the detents and at the other end to one of the stop levers 348. The free ends of the levers 348 are guided by means of ears 349 bent off therefrom in such a way as to leave slots which embrace upwardly projecting parts of the partition plates 230 of the register frame. Each of said levers 348 has a rearwardly projecting arm 350 that normally stands just above the rod 344 as shown in Fig. 12. When the handle 330 is drawn forward and during the lost motion between the rod 344 and the register frame, the levers 348 are tilted by the bar 344 so as to bring their lugs 347 into the paths of the stop arms 233, which, as has been hereinbefore explained, are connected to or form parts of the several register wheels 226.

In order to release the setting-up devices when the register frame is thrown down as described, a link 351 is pivoted at 352 to the plate 332 and the rear end of said link is pivoted at 353 to an arm 354 rigidly mounted on a transverse rock shaft 355 pivoted at its ends in the side plates of the frame 41 below the pawls 161. As shown in Figs. 10 and 18, the shaft 355 has projecting therefrom a series of arms 356, each of which is bent off laterally at the top and lies in front of one of the levers 183 which control the pawls 161. The construction is such that when the handle 330 is drawn forward the link 351 rocks the shaft 355 and the arms 356 disengage all of the pawls 161 from the notches 160 in the plates 140, thus leaving said plates free to be drawn toward the rear of the machine by their springs 145. As the plates and their connections are thus moved, they turn the register wheels until each of said wheels is arrested by its arm 233 and the zero stop 347, said arm 233 being so situated that it arrests the register wheels in zero position.

It will be perceived that the act of setting the register to zero has moved the setting-up devices away from zero position and in order to restore them the handle 330 is pushed from its full line position in Fig. 18 back to its extreme rear position, and then released. The operation of setting the register to zero consists of drawing the handle 330 forward as far as it will go and then pushing it back as far as it will go, and releasing it, whereupon it is automatically restored to normal position. The limits of the motion of this lever are determined by the two abutments 357 and 358 thereon contacting with one of the posts 257 which support the frame plate 256.

The handle 330 is caused to maintain its normal middle position by reason of the fact that any motion of said handle to the rear of said middle position is resisted by the spring 310 which controls the restoring frame because when the handle is in its normal position the pin 334 is just in engagement with the hook 337. When the handle stands in the position shown in full lines in Fig. 18, it is being pushed toward the rear by all of the springs 167 of the pawls 161. When the handle has moved a little back of the position shown, the roller 341, acting on the incline 338, tends to move said handle back to normal position, this roller being under the tension of the restoring spring 296 for the register frame. Said roller is also under the additional tension of a restoring spring of its own which is a flat spring 360 secured at one end to the comb plate 199. At its free end which lies over the arm 342, said spring is bent back into the form of a crook that lies beneath the cross bar 240, as shown, for example, in Figs. 10 and 12.

It will be seen that the zero setting mechanism described will arrest the register at zero only when said wheels are turning in one direction and that the liberating of the setting-up devices is capable of turning said wheels in either direction, depending on the setting of the subtraction key 205. As here shown the stops are arranged to arrest the register wheels at zero when said wheels are turning in the direction in which they turn for subtraction, in which direction they are turned in resetting only when the mechanism is set for addition. I have accordingly provided an interlock between the zero setting mechanism and the subtraction key 205 so that the handle 330 cannot be drawn forward when the machine is set for subtraction and so that, on the other hand, the subtraction key cannot be depressed while said handle is forward of its normal position. To this end the depending arm of the plate 332 is formed with a branch 361, the periphery of which is on the arc of a circle about the axis of the shaft 331 and one of the side plates of the frame which controls the up and down motion of the bars 196 has a rearwardly directed arm 362 with an ear 363 bent off therefrom in such position that when the handle 330 is drawn forward of its normal position said ear lies beneath the arm 361. Said arm terminates at the rear in an abrupt shoulder 364 and as shown in Fig. 11 the ear 363 normally stands just below and immediately back of this shoulder. The construction is such that when the key 205 is in its depressed position the ear 363 stands behind the shoulder 364 and prevents forward motion of the handle 330. This interlock prevents any incorrect operation of the zero setting mechanism. It is preferable, in the zero-setting operation, to turn the wheels backward or in the direction of subtraction, because then the transfer devices are not tripped in the operation.

In the operation of the typewriting machine it sometimes happens that the operator strikes the wrong key and writes the wrong number, or the operator may strike the correct key with insufficient force to print distinctly. In either case it is the custom of typewriter operators to move the carriage back to the letter space position where the error was made and erase the numeral, if it was an erroneous one, or strike the key again if the number was indistinctly written. In case the wrong number was written and the error consisted in writing a digit smaller than the one intended, no harm would be done in the present computing mechanism. The writing of the erroneous digit would have caused the plate 140 to be moved down the number of teeth appropriate to that digit and when that number was erased and a key of higher value struck, said plate would simply move on to the new and correct position. If, however, the number erroneously written was too large, then the slide 68 that would be operated when the correct key was struck, would be back of the arm 170 and the plate 140 would move on as far as it could go and the mechanism would not be set in that denomination to add the correct numeral. Also if the same key were struck twice in the same denomination the same thing would happen because after releasing the key the arm 170 passes on beyond the operated slide 68. In either of these last two events an erroneous total would be arrived at if means were not provided to prevent it. The means herein provided for the purpose consist in devices for locking the operating handle in case any plate 140 has escaped entirely beyond the control of the slides 68. To this end said plates have a freedom of motion a little greater than that necessary for setting up the digit "9" and when any of said plates moves to this abnormal extent it operates the locking devices referred to. This lock consists of a hook 365 on the lower end of an arm 366 which is pivoted on the frame rod 192 which carries the indicator segments 190, said hook being adapted to be moved under the pin 323 that projects from the plate 274 on the operating rock shaft 268 (Figs. 12 and 21). The arm or plate 366 is mounted at one end of the system of indicator levers 191 and an arm 367 is mounted at the other end of said system of levers and the two arms are connected rigidly by a cross bar 368, the whole constituting a bail or yoke frame pivoted on the rod 192. Said frame is held up in normal position by a spring 369 (Figs. 10 and 11) and its motion under the impulse of said spring is limited by an arm 369ª engaging one of the posts 257. Each of the levers 191 is formed with a lug 370 which, in case of an over-setting of one of said levers, strikes the cross bar 368 and depresses it, thus moving the hook 365 under the pin 323 and preventing an operation of the operating handle 267. It is thus rendered impossible for the operator to add in an amount set up in the machine when one of the setting-up devices has been over-set. The remedy is for the operator to reset all of the setting-up devices by means of the handle 330 and then to write the whole number over again correctly.

An interlock is provided between the numeral keys and the register frame of such sort that a key cannot be operated when the register frame is depressed and vice versa, the register frame cannot be depressed when a numeral key is in depressed position. It will be recalled that whenever a numeral key is depressed when the computing mechanism is in operation, the shaft 96 is rocked toward the rear of the machine. This shaft has an arm 371 (Fig. 12) projecting upward therefrom and said arm is connected by means of a link 372 with an arm 373 of a bell-crank pivoted on the shaft 204. Said bell-crank has a forwardly directed arm 374 with an abrupt end which normally stands immediately below and immediately back of the lower end of the depending arm 297 of the register frame. The construction is such that normally the arm 374 is free to move up behind the arm 297 and the arm 297 is free to move back above the arm 274; but when either of these arms is out of normal position it blocks the operation of the other. It will be noted that this interlock prevents the operation of either the operating mechanim or of the zero-setting mechanism while a key is depressed, and that it prevents the depression of a key during the operation of either of those mechanisms.

In order to prevent the operator from forgetting to work the handle 267 after the writing of each number, means are provided to lock the numeral keys after a number has been set up in the computing machine and until the operating handle has been worked or until the setting-up mechanism has been restored to normal by means of the handle 330. This means can be understood by reference to Figs. 10, 11 and 14. A rock shaft 375 is pivoted in the side plates of the frame 41 a short distance in front of the rod 136, and said rock shaft has rigidly mounted thereon a plate 376. As here shown, said plate has three arms 377 projecting from one edge thereof and bent around the shaft 375 and rigidly secured to said shaft. Each of the plates 141 is formed with a projection 378 having its periphery concentric with the rod 136 but formed with a notch 380. The plate 376 normally has its free edge resting in these notches 380, as shown in Fig. 12, but when any of the plates 141 is moved away from its normal position by the setting-up of a digit in that denomination, it rocks the plate 376 downward, said plate then riding on the concentric part of the projection 378 and this motion rocking the rock shaft 375. Said rock shaft has an arm 381 rigidly mounted on the right-hand end thereof and said arm has connected thereto a spring 382, the other end of which is connected to a post 383 (Fig. 13) projecting from the side plate 133. At its lower end the arm 381 has pivoted thereto at 384, one end of a link 385 which is formed with the angular outline shown in order to avoid interference with other parts. Said link extends toward the rear of the machine and has a horizontal slot 386 therein through which there passes a pin 387 projecting from the depending arm of a bell crank 388 which is pivoted on a screw 390 threaded into the frame plate 133. The bell crank 388 has a rearwardly extending arm which at its rear end has an ear 391 bent off therefrom and standing immediately above and immediately in the rear of the upper end of an arm 392 that is mounted on the rock shaft 96. The construction is such that normally the ear 391 is free to move down behind the arm 392 and normally said arm is free to move toward the rear beneath said ear; but when either of these parts is out of normal position it blocks the operation of the other. The stop 391 is normally held up out of the path of the arm 392 by the spring 382 but when any of the setting-up devices is operated the link 385 moves forward, thus leaving the stop lever 388 free to drop by gravity into locking position, so far as the link 385 is concerned. When the typewriter carriage is in the adding column, however, this lever can also be held up by means of a dog 393 pivoted to the lever 388 on a screw 394 and having an ear 395 bent off therefrom in position to rest on a disk 396 mounted on the rock shaft 178. This disk is of circular outline through the greater part of its periphery but it is formed with a cut-out 397 through part of its periphery. The construction is such that when the typewriter carriage is in the adding column the part of the disk 396 of full radius is beneath the ear 395 and this disk will therefore hold the lever 388 in its inoperative position, even though some of the setting-up devices have been operated. When, however, the carriage reaches the end of the adding column the ear 395 drops down into the cut-out 397 and allows the stop 391 to come behind the arm 392 and locks the numeral keys against operation. The dog 393 is formed with a weighted end 398 that normally rests on the ear 391 so as to allow the dog to turn in one direction but not in the other. When the carriage reaches the end of an adding column and takes one letter space step beyond the position of lowest denomination the ear 395 drops into the cut-out 397, bringing the lock 391 to operative position. At the next step of the carriage the dog 102 escapes from the column stop 26 and the denomination selecting devices of the computing machine are restored to normal position, an operation which rotates the shaft 178 toward the back of the machine. The dog 393 is free to turn so as to allow the shaft to turn in that direction but without raising the lock 391 out of the path of the arm 392. The result is that the numeral keys stand locked and they will remain locked until the lever 388 is pushed up to its normal position by the link 385, which will not occur until all of the resetting devices are reset to normal position, either by an operation of the operating handle 267 or else by means of the resetting lever 330.

In order to disconnect the computing mechanism entirely from the typewriter mechanism, a disconnect key 400 is provided, said key being mounted on the upper end of a stem 401 (Fig. 12) which at its lower end is pivoted to a bell-crank 402 pivoted on a screw 403 threaded into the left-hand side plate 134. Said bell-crank has a depending arm 404 to which is connected the forward end of a long link 405, the rear end of which is connected to a lever arm or crank arm 406 rigidly mounted on the rock shaft 128, which rock shaft, it will be recalled, is operated by the typewriter carriage when the latter is passing through an adding column. The key stem 401 is formed with a notch 407 which, when the key is fully depressed, is adapted to be hooked under the top plate 132 to hold the key in depressed position. When the disconnect key is depressed to this extent it rocks the shaft 128 a little farther than it is ever rocked automatically, with the result that the dog 102 is moved down to such an extent that the column stops 26 pass over it in either direction. The result is that the typewriter carriage is free to move to any extent in either direction without having any effect on the computing mechanism. The parts are shown with the disconnect key in its depressed position in Fig. 9. The arm or plate 127 which is mounted on the right-hand end of the shaft 128 and which is connected with the operating link 126, has a branch 408 which, when the shaft 128 is rocked to the extent shown in Fig. 9, operates on an arm 410 projecting from the rock shaft 57 and moves said arm and rocks said shaft to such an extent as to depress the levers 54 out of the paths of the lugs 53, so that when a numeral key is operated the lug 53 connected therewith passes over the top of the lever 54 without operating said lever. The shaft 57 is held in its normal position, shown in Fig. 2, by means of a spring 411 connected at one end to an arm 412 of said shaft and at the other end to a fixed part of the machine. The motion of the shaft under the impulse of said spring is limited by an arm 413 striking the bolt 124 hereinbefore described.

It will, of course, be understood that many of the features above described, are capable of considerable modification without departing from my invention, and that some of said features are capable of use in or adaptation to machines differing in many respects from the specific machine shown in the drawing. I have deemed it sufficient to describe in detail one machine that embodies the invention, without pointing out all of the modifications that can be made or all of the different applications of which the several features of the invention are capable.

What I claim as new and desire to secure by Letters Patent, is:—

1. In a combined typewriting and computing machine, the combination of a computer frame, a typewriter frame mounted on said computer frame, a series of printing keys in said typewriter frame including numeral keys, horizontally movable bars mounted in the typewriter frame and operated by said numeral keys, an oscillatory support mounted in said computer frame, a series of key connections mounted in said support and normally in position to be operated by said horizontally movable bars, and means for rocking said support to move said connections downward out of the paths of said bars.

2. In a combined typewriting and computing machine, the combination of a computer frame, a typewriter frame mounted detachably on said computer frame, a series of printing keys including numeral keys in said typewriter frame, a pivoted support in said computer frame, a series of levers fulcrumed on and eccentrically of said support, means operated by said numeral keys for operating said levers, and means for rocking said support to withdraw said levers lengthwise from said operating means.

3. In a combined typewriting and computing machine, the combination of a computer frame, a typewriter frame mounted on said computer frame, a series of printing keys including numeral keys in said typewriter frame, said numeral keys being arranged in two rows, one at the right-hand side of the machine, one at the left-hand side of the machine, two sets of rock shafts in said computer frame beneath the typewriter, means whereby said numeral keys operate said rock shafts, registering mechanism at one of said sides of the machine, and means including a series of bell-cranks for transmitting the motion of said rock shafts laterally to parts of said registering mechanism.

4. In a combined typewriting and computing machine, the combination of a computer frame, a typewriter frame detachably mounted on said computer frame, a series of printing keys in said typewriter frame including numeral keys, a series of horizontally movable bars operated by said printing keys, levers in the computer frame operative by said bars, a series of rock shafts in said computer frame, links connecting said rock shafts with said levers, and digit determining devices operated by said rock shafts.

5. In a combined typewriting and computing machine, the combination of a computer frame, a typewriter frame detachably mounted on said computer frame, a series of printing keys in the typewriter frame including numeral keys, a series of horizontally movable bars operated by said printing keys, levers in the computer frame operated by said bars, a series of rock shafts in said computer frame, links connecting said rock shafts with said levers, digit determining devices operated by said rock shafts, and means for moving said levers out of coöperation with said bars.

6. In a computing machine, the combination of a numeral key, a stop, and connections between said key and stop, said connections including a rock shaft, an arm loose on said shaft, a collar secured on said shaft and projecting over the hub of said arm, a spring coiled about said collar and connected to said collar and to said arm, a second collar secured on said shaft and having arms projecting into contact with said hub to prevent motion of said hub lengthwise of said shaft, and a stop to limit the motion of said arm under the impulse of said spring.

7. In a combined typewriting and computing machine, the combination of a typewriter frame, a computer frame comprising a base part beneath said typewriter frame and a casing at one side of said typewriter frame, typewriter mechanism in said typewriter frame and including a series of numeral printing keys arranged in two sets at the two sides of the keyboard, connections from said numeral keys through said base part into said casing, two universal bars in said base part, one universal bar for each of said sets of keys, and a rock shaft operated by both universal bars and extending into said casing.

8. In a combined typewriting and computing machine, the combination of a typewriter frame, a computer frame comprising a base part beneath the typewriter frame and another part at one side of the typewriter frame, printing keys and a carriage in said typewriter, registering mechanism, differential mechanism therefor and denomination selecting mechanism in said side part of the computer frame, key connections and carriage connections in said base part of the computer frame, and means for conveying the motion of said key and carriage connections to said differential and denomination selecting mechanisms.

9. In a combined typewriting and computing machine, the combination of a typewriter frame, a computer frame comprising a base part beneath said typewriter frame and a casing at one side of said typewriter frame, typewriter mechanism including a carriage in said typewriter frame, computing mechanism in said casing, said mechanism including a rock shaft and connections for determining denominations, said rock shaft extending into said base part, and connections from said rock shaft through said base part and up behind the typewriter frame to said carriage.

10. In a combined typewriting and computing machine, the combination of a typewriter frame, a computer frame comprising a base part beneath said typewriter frame and a casing at one side of said typewriter frame, typewriter mechanism in said typewriter frame and including a carriage and keys for printing numerals and other characters, computing mechanism in said casing and including denomination determining mechanism and digit determining mechanism, connections from said numeral keys through said base part to said digit determining mechanism, connections from said carriage through said base part to said denomination determining mechanism, a disconnect key arranged to move said carriage connections to an inoperative position, and means operated by said key for breaking the connections from said numeral keys to said digit determining mechanism.

11. In a combined typewriting and computing machine, the combination of a typewriter carriage, denomination selecting mechanism for the computer comprising a part to be moved step-by-step in unison with said carriage, and connections between said carriage and said part including a lever-arm adjustable as to its length in order to regulate the relative extents of motion of said part and said carriage.

12. In a combined typewriting and computing machine, the combination of a typewriter carriage, denomination selecting mechanism for the computer comprising a part to be moved step-by-step in unison with said carriage, and connections between said carriage and said part including a lever-arm adjustable as to its length in order to regulate the relative extents of motion of said part and said carriage, and means adjustable to regulate the initial relative positions of said part and said carriage.

13. In a combined typewriting and computing machine, the combination of a typewriter carriage, a pull link operated by said typewriter carriage and including two telescoping parts, a spring for holding said telescoping parts in normal relation, and denomination selecting devices for the computer operated by said link.

14. In a combined typewriting and computing machine, the combination of a typewriter carriage, a two-part telescoping link operated by said carriage, a spring for holding the two parts of said link in normal relation, an adjustable stop for limiting the relative motion of the two parts of said link under the impulse of said spring, and denomination selecting devices for the computer operated by said link.

15. In a combined typewriting and computing machine, the combination of a typewriter carriage, denomination selecting mechanism for the computer comprising a device to be moved step-by-step in unison with said carriage, connections between said carriage and said part including a pull link operated by said typewriter carriage and having two telescoping parts, a spring for holding said telescoping parts in normal relation, and means for delaying the stepping motion of said step-by-step moving device until after the carriage has begun its stepping motion.

16. In a combined typewriting and computing machine, the combination of a typewriter frame, a computer frame having a base part on which said typewriter frame is mounted and a side part, a typewriter carriage, a rock shaft in said base part, a connection from said carriage to said rock shaft, denominational devices in said side part, means for selectively operating said denominational devices, said means including a rock shaft in said side part, and a connection between said rock shafts.

17. In a combined typewriting and computing machine, the combination of a typewriter frame, computer framework at one side of said typewriter frame, a series of keys and printing instrumentalities in said typewriter frame for writing any words and numbers, a series of setting-up devices in said computer framework, said devices arranged to move in planes extending from front to back of the machine, a group of stop-slides arranged across said series of setting-up devices and each slide movable lengthwise, connections from said slides to the numeral keys of the typewriter, and means for setting said setting-up devices against said slides one at a time as the keys are operated.

18. In a combined typewriting and computing machine, the combination of a typewriter frame, a computer framework at one side of said typewriter frame, a series of keys and printing instrumentalities in said typewriter frame for writing any words and numbers, a series of setting-up devices in said computer framework, said devices arranged to move in planes extending from front to back of the machine, a group of stop slides arranged across said series of setting-up devices and each slide movable lengthwise, a series of stop projections on each of said slides, one projection for each of said setting-up devices, connections from said slides to the numeral keys of the typewriter arranged when one of said keys is depressed to move the corresponding slide in a transverse direction, and means for setting said setting-up devices against said slides one at a time as the keys are operated.

19. In a combined typewriting and computing machine, the combination of a typewriter frame, a computer frame including a base part beneath said typewriter frame and a side part at one side of said typewriter frame, a series of denominational devices in said side part, a set of stop slides arranged across said series of denominational devices and each movable lengthwise, a series of printing keys and printing instrumentalities in said typewriter frame for writing any words and numbers, and connections extending through said base part to said slides from the numeral keys of the typewriter.

20. In a computing machine, the combination of a register wheel, a longitudinally movable rack-bar for operating said wheel, a swinging segment to which said rack-bar is connected, numeral keys, key-controlled stops coöperating with said segment, a spring for swinging said segment toward said stops, a detent for holding said segment against the tension of said spring, and means for restoring said segment against the tension of said spring.

21. In a computing machine, the combination of a register wheel, a longitudinally movable rack-bar for operating said wheel, a swinging segment to which said rack-bar is connected, numeral keys, key-controlled stops coöperating with said segment, means for swinging said segment at the time of a key depression, means for restoring said segment, and an item indicator connected with said segment.

22. In a computing machine, the combination of a register wheel, a longitudinally movable rack-bar having two racks thereon for operating said wheel, a swinging segment to which said rack-bar is connected, numeral keys, key-controlled stops coöperating with said segment, means for swinging said segment, means for gearing said register wheel with either of said racks, and transfer mechanism adapted for addition or subtraction.

23. In a computing machine, the combination of a register wheel, a longitudinally movable rack-bar having two racks thereon for operating said wheel, a swinging segment to which said rack-bar is connected, numeral keys, key-controlled stops coöperating with said segment, means for swinging said segment, a driving gear for said register wheel between said racks and constantly engaged by one or the other of said racks, means for moving said rack-bar to bring either rack into mesh with said gear, and means for moving said register wheel into and out of gear with said driving gear.

24. In a computing machine, the combination of a register wheel, a longitudinally movable rack-bar having two racks thereon for operating said wheel, a swinging segment to which said rack-bar is connected, numeral keys, key-controlled stops coöperating with said segment, a spring for swinging said segment toward said stops, a detent for holding said segment against the tension of said spring, means operated by any of said keys for releasing said detent, means for restoring said segment against the tension of said spring, and means for gearing said register wheel with either of said racks for addition or subtraction.

25. In a computing machine, the combination of a register wheel, a longitudinally movable rack-bar having two racks for operating said wheel, a swinging segment to which said rack-bar is connected, numeral keys, key-controlled stops coöperating with said segment, means for swinging said segment at the time of a key depression, means for restoring said segment, means for gearing said register wheel with either of said racks for addition or subtraction, and an item indicator connected with said segment.

26. In a computing machine, the combination of a series of register wheels, a series of longitudinally movable rack-bars for operating said register wheels, a series of swinging segments for controlling said rack-bars, a single group of numeral keys common to all of said rack-bars and segments, stops for said segments controlled by said keys, a series of springs for drawing said segments against said stops, a series of detents for said segments, and denomination selecting devices arranged to cause a selected one of said detents to be withdrawn when a key is depressed.

27. In a computing machine, the combination of a series of setting-up devices each comprising a swinging segment and a longitudinally movable rack-bar, a group of keys common to all of said setting-up devices, a group of stop slides, one for each key, arranged across said series of segments and disposed in curved arrangement about the axis of said segments and each of said slides having a series of stop projections one for each segment, and means for setting the segments against said stops one at a time as the keys are operated.

28. In a computing machine, the combination of a series of register wheels; a series of denominational mechanisms each comprising two parts pivoted side by side, a spring connecting said two parts, a stop to limit the relative motion of said parts under the impulse of said spring, and a rack-bar connected with one of said parts, said rack-bar having two racks thereon and arranged to operate one of said register wheels through one of said racks for addition and through the other of said racks for subtraction; means for setting said denominational mechanisms in accordance with the digits of a number to be registered; operating mechanism acting on the other of said pivoted parts to restore it to and past normal position; and transfer devices to control the moving of said rack-bar past normal position.

29. In a computing machine, the combination of a series of register wheels; a series of denominational mechanisms each comprising two parts pivoted side by side, a spring connecting said two parts, a stop to limit the relative motion of said parts under the impulse of said spring, and two racks connected with one of said parts and arranged to be geared alternatively with the register wheel, one of said racks turning said register wheel for addition and the other of said racks turning the wheel in the other direction for subtraction; means for setting said denominational mechanisms in accordance with the digits of the number to be registered; operating mechanism acting on the others of said pivoted parts to restore them to and past normal position; and transfer devices to control the movement of said racks past normal position.

30. In a computing machine, the combination of a series of register wheels, a series of racks for operating said wheels, a series of controlling devices for said racks, means for setting said controlling devices and racks in accordance with the digits of a number to be registered, means for restoring said controlling devices and racks to normal position or to one space beyond normal position, and a series of transfer devices each including a lever operated by a register wheel, a movable stop for the controlling device, and a link connecting said lever with said stop.

31. In a computing machine, the combination of a series of register wheels, a series of longitudinally movable rack-bars for operating said register wheels, a series of pivoted segments for controlling said rack-bars, means for setting said segments and rack-bars in accordance with the digits of a number to be registered, means for restoring said segments and rack-bars to or one space beyond normal position, and transfer devices each including a lever arranged to be operated by a register wheel, a movable stop normally operating to arrest a segment at normal position, and a link connecting said lever with said stop.

32. In a computing machine, the combination of a series of register wheels, a series of longitudinally movable rack-bars for operating said register wheels, a series of pivoted segments for controlling said rack-bars, means for setting said segments and rack-bars in accordance with the digits of a number to be registered, means for restoring said segments and rack-bars to or one space beyond normal position, and transfer devices each including a lever arranged to be operated by a register wheel, a movable stop normally operating to arrest a segment at normal position, a link connecting said lever with said stop, and a latch for holding said stop temporarily in its abnormal position.

33. In a computing machine, the combination of a series of register wheels, a series of longitudinally movable rack-bars for operating said register wheels, a series of pivoted segments for controlling said rack-bars, means for setting said segments and rack-bars in accordance with the digits of a number to be registered, means for restoring said segments and rack-bars to or one space beyond normal position, and transfer devices each including a lever arranged to be operated by a register wheel, a movable stop normally operating to arrest a segment at normal position, a link connecting said lever with said stop, and a latch for holding said stop temporarily in its abnormal position, said latch being arranged to be tripped by said segment when said segment is restored beyond normal position.

34. In a computing machine, the combination of a series of register wheels, a series of longitudinally movable rack-bars for operating said wheels, numbered indicators connected to move in unison with said rack-bars, a single group of keys common to all denominations, means under control of said keys for setting said rack-bars and indicators one after another in accordance with a number, means for restoring said rack-bars and indicators and operating said register wheels in accordance with said number, and means for restoring said indicators and rack-bars independently of said register wheels, whereby errors in the setting of said rack-bars can be corrected without operating the register wheels.

35. In a computing machine, the combination of a series of longitudinally movable rack-bars, a series of numbered swinging indicator segments connected at all times to move in unison with said rack-bars, a single group of keys common to all denominations, means under control of said keys for setting said rack-bars and segments one after another in accordance with a number, and a register operated by said rack-bars.

36. In a computing machine, the combination of a series of longitudinally movable rack-bars, a series of numbered swinging indicator segments, links connecting said segments with said rack-bars, a single group of keys common to all denominations, means under control of said keys for setting said rack-bars and segments one after another in accordance with a number, and a register operated by said rack-bars.

37. In a computing machine, the combination of a series of register wheels, a series of longitudinally movable rack-bars for operating said register wheels, a series of numbered indicators each connected at all times to move in unison with one of said rack-bars, a single group of keys common to all denominations, and means whereby the operation of said keys sets upon said rack-bars and indicators a number to be registered on said register wheels.

38. In a computing machine, the combination of a series of register wheels, a series of longitudinally movable rack-bars for operating said wheels, a series of segments to which said rack-bars are connected, differential devices for controlling said segments, and a series of pivoted item indicator segments connected with the first mentioned segments and with said rack-bars.

39. In a computing machine, the combination of a series of register wheels, a series of denominational devices for operating said register wheels, a series of item indicators, and means operated by said indicators for preventing the operation of said register wheels in the case of an over-operation of one of said indicators.

40. In an adding machine, the combination of a series of register wheels, setting-up devices for setting up a number to be registered on said wheels, operating mechanism for operating said register wheels in accordance with the number set up, a series of item indicators for indicating the number set up on said setting-up devices, and means operated by said indicators for locking said operating mechanism in case of an over-operation of any of said indicators.

41. In a computing machine, the combination of a series of register wheels, denominational devices for operating said register wheels, a series of indicator segments connected with said denominational devices, a frame arranged to be moved by any of said segments in the case of an over-operation of said segment, and a lock operated by said frame.

42. In a computing machine, the combination of a series of register wheels, a series of setting-up devices for setting-up a number to be registered on said wheels, a frame rod, a series of indicator segments pivoted on said frame rod and connected with said setting-up devices, a yoke frame pivoted on said frame rod and arranged to be moved by any of said segments in case of an over-setting of said segments, operating mechanism for operating the register in accordance with the number set up on the setting-up devices, and a lock for said operating mechanism controlled by said yoke frame.

43. In a computing machine, the combination of a series of denominational devices, a series of parts for controlling the operation of said devices, a series of feelers having sliding connections with said parts, means for moving the entire series of feelers in the direction of said sliding connections, and means for obstructing a selected one of said feelers to modify its motion and to operate the corresponding part.

44. In a computing machine, the combination of a series of denominational devices, a series of detents for controlling said denominational devices, a series of feelers having sliding connections with said detents, means for moving the entire series of feelers in the direction of said sliding connections, and means for obstructing a selected one of said feelers to modify its motion and to operate the corresponding detent.

45. In a computing machine, the combination of a series of denominational devices, a series of detents for said denominational devices, a series of feelers, means for moving the entire series of feelers, and means for obstructing one of said feelers to modify its motion, each of said feelers arranged when so obstructed to act by direct pin and slot connection on one of said detents to operate said detent, and when not obstructed to move idly with relation to said detent.

46. In a computing machine, the combination of a series of pivoted segments, a series of springs tending to move said segments to set positions, stops to arrest said segments in different positions, a series of detents for said segments, a series of feelers having direct sliding connections with said detents, means for moving the entire series of feelers, and means for obstructing a selected one of said feelers, each of said feelers being arranged when obstructed to operate one of said detents and when not obstructed to move idly with relation to said detent.

47. In a combined typewriting and computing machine, the combination with the carriage, printing instrumentalities and the keys, including numeral keys, of the typewriter, of a series of denominational devices, a denomination selecting device arranged to be moved step-by-step by the typewriter carriage, a series of feelers operated by any of said numeral keys and each consisting of a bell-crank with an up-turned end to one of its arms, said feelers arranged to be obstructed one at a time by said denomination selecting device, means whereby the obstructed feeler causes a digit to be set up, the up-turned end of said arm of one of the unobstructed feelers momentarily preventing further motion of said denomination selecting device, and means for allowing the typewriter carriage to step in advance of said denomination selecting device.

48. In a combined typewriting and computing machine, the combination with the series of printing instrumentalities and the keys, including numeral keys, of the typewriter, of a spirally arranged series of pins connected up to be turned step-by-step by the typewriter carriage, a series of feelers arranged to be operated by any of said numeral keys and each consisting of a bell crank with an up-turned end to one of its arms, and a selected one of said feelers being arranged to be obstructed by one of said pins depending on the position of the typewriter carriage and of said series of pins, means whereby the obstructed feeler causes a digit to be set up, and means whereby the up-turned end of said arm of one of the unobstructed feelers comes into the path of one of said pins and thus prevents momentarily further stepping of the series of pins, and means for permitting the typewriter carriage to step in advance of said series of pins.

49. In a computing machine, the combination of a series of register wheels, a group of numeral keys common to all denominations, a series of setting-up devices for setting up numbers to be registered on said wheels, a series of feelers for controlling said setting-up devices, means whereby the entire series of feelers is moved at each operation of a numeral key, means for obstructing a selected one of said feelers, means whereby the obstructed feeler causes a digit to be set up in the corresponding denomination, and resetting devices for said register wheels including means for operating all of said feelers to release all of said setting-up devices at once.

50. In a computing machine, the combination of a series of register wheels, a series of racks for operating said register wheels, a group of keys common to all of said racks, means controlled by said keys for setting up on said racks one after another the digits of a number to be registered, an operating handle and connections arranged to move said register wheels into gear with said racks and to restore said racks to normal position, means independent of said operating handle for restoring said racks to normal position independently of the register wheels, and special means for moving said racks to set position in gear with said register wheels in order to bring said register wheels to zero.

51. In a computing machine, the combination of a series of register wheels and a series of racks normally out of gear with said register wheels, a group of keys common to all of said racks, means controlled by said keys for setting said racks one at a time in accordance with the digits of a number to be registered, operating mechanism for bringing said register wheels and racks into gear and restoring said racks to register the number, an add-and-subtract key, means controlled by said key to change the gearing so as to cause the number set up to be either added or subtracted, means for first moving said register wheels into gear with said racks and then moving the racks to set the wheels to zero, and means for restoring the racks independently of the register wheels.

52. In a computing machine, the combination of a series of register wheels and a series of racks normally out of gear with said register wheels, a group of keys common to all of said racks, means controlled by said keys for setting said racks one at a time in accordance with the digits of a number to be registered, operating mechanism for bringing said register wheels and racks into gear and restoring said racks to register the number, an add-and-subtract key, means controlled by said key to change the gearing so as to cause the number set up to be either added or subtracted, means for first moving said register wheels into gear with said racks and then moving the racks to set the wheels to zero, and means for restoring the racks independently of the register wheels, said restoring means being independently operable to correct errors in the setting of said racks.

53. In a computing machine, the combination of a series of register wheels and a series of racks normally out of gear with said register wheels, a group of keys common to all of said racks, means controlled by said keys for setting said racks one at a time in accordance with the digits of a number to be registered, operating mechanism for bringing said register wheels and racks into gear and restoring said racks to register a number, an add-and-subtract key, means controlled by said key to change the gearing so as to cause the number set up to be either added or subtracted, means for first moving said register wheels into gear with said racks and then moving the racks to set the wheels to zero, means for restoring the racks independently of the register wheels, and an interlock between said zero setting means and said add-and-subtract key to insure that when the zero setting means is operated the register wheels shall be turned in the right direction.

54. In a computing machine, the combination of a series of register wheels and a series of setting-up devices for setting up numbers to be registered, operating mechanism for operating said register wheels in accordance with the number set up, a special handle normally maintained in a middle position and movable in either direction from such middle position, means operated by said handle when moved in one direction for setting the register to zero, and means operated by said handle when moved in the other direction for restoring said setting-up devices to normal independently of the register.

55. In a computing machine, the combination of a series of register wheels, a series of racks normally out of gear with said register wheels, means for setting said racks in accordance with numbers to be registered, operating mechanism for bringing said wheels and racks into gear and restoring said racks to register the number set up, a special handle movable in either direction from a normal middle position, means operated by said handle when moved in one direction for bringing said register wheels and racks into gear and for releasing said racks to restore the register wheels to zero, and means operated by said handle when moved in the other direction for restoring said racks to normal position independently of the register.

56. In a computing machine, the combination of a series of register wheels, a series of racks normally out of gear with said register wheels, means for setting said racks in accordance with a number to be registered, operating mechanism for bringing said wheels and racks into gear and restoring said racks to register the number set up, a special handle movable in either direction from a normal middle position, means operated by said handle when moved in one direction for bringing said register wheels and racks into gear and for releasing said racks to restore the register wheels to zero, and means operated by said handle when moved in the other direction for restoring said racks to normal position independently of the register, said special handle being movable to re-set the racks for the purpose of correcting errors in setting said racks.

57. In a computing machine, the combination of a series of register wheels, a series of racks for operating said register wheels, means for operating said racks to register a number on said wheels, a resetting handle, means normally in inoperative position but moved by said resetting handle into position to arrest said register wheels at zero, means for causing said racks to turn said register wheels until arrested by said arresting means, and means operated by said resetting handle for restoring said racks independently of said register wheels.

58. In a computing machine, the combination of a series of register wheels, a series of racks for operating said register wheels, means for operating said racks to register a number on said wheels, a resetting handle, means normally in inoperative position but moved by said resetting handle into position to arrest said register wheels at zero, means controlled by said handle for causing said racks to turn said register wheels until arrested by said arresting means, and means operated by said handle for restoring said racks to normal after the wheels have been set to zero.

59. In a computing machine, the combination of a series of register wheels, a series of racks, means for setting said racks in accordance with a number, an operating handle, means operated by said handle for operating said register wheels in accordance with the number set up on said racks, a resetting handle, and means operated by said resetting handle for causing said racks to set said wheels to zero and for thereafter restoring said racks to normal.

60. In a computing machine, the combination of a series of register wheels, a series of racks normally out of gear with said register wheels, means for setting said racks in accordance with a number to be registered, operating mechanism for bringing said register wheels and racks into gear and for restoring said racks to register the number, a re-setting handle, means normally in inoperative position but moved by said re-setting handle into position to arrest said register wheels at zero, means operated by said handle for bringing said register wheels and racks into gear, means operated by said handle for releasing said racks to cause said racks to set said register wheels to zero, and means operated by said handle for restoring said racks to normal after the wheels have been set to zero.

61. In a computing machine, the combination of a series of register wheels, a series of racks normally out of gear with said register wheels, means for setting said racks in accordance with a number to be registered, operating mechanism for bringing said register wheels and racks into gear and for restoring said racks to register the number, a re-setting handle, means normally in inoperative position but moved by said re-setting handle into position to arrest said register wheels at zero, means operated by said handle for bringing said register wheels and racks into gear, means operated by said handle for releasing said racks to cause said racks to set said register wheels to zero, and means operated by said handle for restoring said racks to normal position independently of said register wheels.

62. In a computing machine, the combination of a series of racks, means for setting said racks in accordance with a number to be registered, a series of register wheels, a pivoted frame for said register wheels normally in such position as to maintain said wheels out of gear with said racks, a series of pivoted stop arms for arresting said registering wheels at zero but normally in inoperative position, a frame arranged when operated to move said stop arms to operative position and to move said register frame to bring the register wheels into gear with said racks, and means for releasing said racks to set said register wheels to zero.

63. In a computing machine, the combination of a series of racks, means for setting said racks in accordance with a number to be registered, a series of register wheels, a pivoted frame for said register wheels, a series of pivoted stops for arresting said register wheels at zero but normally in inoperative position, a yoke frame pivoted co-axially with said frame and having a bar in position to operate said stops and said yoke frame being adapted by a further motion to move said frame to bring the register wheels into gear with the racks, and means for operating said yoke frame and releasing said racks.

64. In a computing machine, the combination of a series of racks, means for setting said racks in accordance with a number to be registered, a series of register wheels, a pivoted frame for said register wheels, a series of pivoted stops for arresting said register wheels at zero but normally in inoperative position, a yoke frame pivoted co-axially with said frame and having a bar in position to operate said stops and said yoke frame being adapted by a further motion to move said register frame to bring the register wheels into gear with the racks, a re-setting handle for operating said yoke frame and releasing said racks, and means operated by said handle for restoring said racks independently of the register wheels.

65. In a computing machine, the combination of a series of register wheels, setting-up devices for setting up a number to be registered, means for operating said wheels in accordance with the number set up on said setting-up devices, a re-setting handle movable in either direction from a normal middle position, means operated by said handle when moved in one direction for causing said register wheels to turn and for arresting said wheels at zero, and means operated by said handle when moved in the other direction for restoring said setting-up devices independently of said register wheels.

66. In a computing machine, the combination of a series of racks, means for setting said racks in accordance with a number to be registered, a series of register wheels, means for operating said wheels in accordance with the setting of said racks, a re-setting handle, means operated by said handle when moved in one direction for causing said racks to set said register wheels to zero, and means operated by said handle when moved in the other direction for restoring said racks independently of said register wheels.

67. In a computing machine, the combination of a series of register wheels, means for turning said register wheels, means for setting the mechanism to cause said turning means to rotate said wheels in one direction or the other for addition or subtraction, means normally out of operation but capable of arresting said register wheels at zero when turned in one direction, re-setting mechanism for bringing said arresting means into operation and for causing said turning means to turn said register wheels against said arresting means, and means to prevent the operation of said re-setting mechanism when said setting means is set to cause the register wheels to be turned in the wrong direction.

68. In a computing machine, the combination of a series of denominational devices, a single group of keys common to said denominational devices, denomination selecting mechanism for bringing said denominational devices one after another under the control of said keys, and a lock for said keys controlled by the joint action of said denominational devices and said denomination selecting mechanism.

69. In a computing machine, the combination of a register, setting-up devices for setting up numbers to be registered, a single group of keys common to said setting-up devices, denomination selecting mechanism for bringing said setting-up devices one after another under the control of said keys, a lock for said keys controlled by the joint action of said setting-up devices and said denomination selecting devices, and operating mechanism arranged to register the number set up on said setting-up devices and to release said lock.

70. In a computing machine, the combination of a series of denominational devices, a group of keys common to said denominational devices, denomination selecting mechanism, a lock, and two independent means for holding said lock in its unlocking position, one of said means being controlled by said denominational devices and the other by said denomination selecting mechanism.

71. In a computing machine, the combination of a series of denominational devices, a group of keys common to said denominational devices, denomination selecting mechanism including a part that moves step-by-step as the keys are operated, a lock for said keys, yielding means for holding said lock out of operation, means whereby any of said denominational devices when operated releases the lock from said yielding means, and a flange on said step-by-step moving part arranged to hold said lock out of operation until said part has completed its series of stepping movements.

72. In a computing machine, the combination of a series of denominational devices, a group of keys common to said denominational devices, denomination selecting mechanism including a part that moves step-by-step as the keys are operated, a lock for said keys, yielding means for holding said lock out of operation, means whereby any of said denominational devices when operated releases the lock from said yielding means, a flange on said step-by-step moving part arranged to hold said lock out of operation until said part has completed its series of stepping movements, and means for causing said step-by-step moving part to return to initial position without releasing said lock.

73. In a computing machine, the combination of a series of denominational devices, a group of keys common to said denominational devices, denomination selecting mechanism comprising a rotary shaft that turns step-by-step as the keys are operated, a lock for said keys, and two means for holding said lock out of operation, one of said means being controlled by said denominational devices and the other by said shaft.

74. In a combined typewriting and computing machine, the combination of the carriage, printing instrumentalities and keys of the typewriter, a connection arranged to be moved step by step by the typewriter carriage as said carriage passes through an adding zone and to snap back to normal position at the end of the adding zone, a step-by-step moving part in the computer controlled by said connection, a series of denominational devices controlled by the numeral keys and selected by said step-by-step moving part, a register, an operating handle for operating said register in accordance with the numbers set up on said denominational devices, a lock for the numeral keys of the typewriter, means controlled by said denominational devices and by said step-by-step moving part for holding said lock out of operation, and means to permit said step-by-step moving part to return to normal position without releasing said lock.

75. In a computing machine, the combination of a series of register wheels, a movably mounted register frame in which said wheels are mounted, a series of racks for operating said register wheels, said wheels being normally out of gear with said racks, means for setting said racks in accordance with the digits of a number, an operating handle having a to and fro motion, means operated by said handle on its forward stroke for first moving said register frame to bring said wheels into gear with said racks and then restoring said racks and operating said wheels, and a trip-off connection between said register frame and said handle for disconnecting said frame from the said handle at the beginning of the return stroke of said handle.

76. In a computing machine, the combination of a series of register wheels, a movably mounted register frame in which said wheels are mounted, a series of racks for operating said wheels, said wheels being normally out of gear with said racks, means for setting said racks in accordance with the digits of a number, an operating handle having a to and fro motion, means operated on the forward stroke of said handle for first moving said register frame to bring said wheels into gear with said racks and then restoring said racks and operating said wheels, said rack restoring means including a part that comes to a dead center in the latter part of the forward stroke of the handle, and a trip-off connection operated at the beginning of the return stroke of said handle for disconnecting said register frame from said handle.

77. In a computing machine, the combination of a series of register wheels, a movably mounted register frame in which said wheels are carried, a series of racks for operating said wheels, said wheels being normally out of engagement with said racks, means for setting said racks in accordance with the digits of a number, an operating handle, means operated by the forward stroke of said handle for first moving said frame to bring said wheels into gear with said racks, and then restoring said racks to operate said wheels, transfer devices for allowing to any of said racks on occasion an additional increment of motion, the connections between said handle and said restoring means including a part that comes to a dead center in the forward stroke of the handle, and a trip-off connection operated at the beginning of the return stroke of the handle for disconnecting said register frame from said handle.

78. In a computing machine, the combination of a pivoted register frame, a series of register wheels mounted in said frame, racks for operating said wheels, means for setting said racks in accordance with the digits of a number, an operating handle, an arm pivotally connected with said register frame, a latch normally holding said arm in rigid relation with said frame, means operated by said handle and acting on said arm to move said frame into gear with said racks, and means operated by said handle for tripping said latch to disconnect the register frame from the handle.

79. In a computing machine, the combination of a movably mounted register frame, register wheels mounted in said frame, devices for operating said wheels, said wheels being normally out of gear with said devices, operating mechanism, means including a trip-off connection whereby said operating mechanism moves said register frame into position where said wheels gear with said register wheel operating devices, and means for tripping said connection to allow said register frame to be restored to normal position.

80. In a computing machine, the combination of a movably mounted register frame, register wheels carried by said frame, devices for operating said register wheels, operating mechanism including a cam having a dwell for moving said register frame to bring said wheels into gear with said wheel operating devices and for maintaining said wheels in such engagement, and a follower for said cam having a trip-off connection with said frame.

81. In a computing machine, the combination of a movably mounted register frame, register wheels carried by said frame, devices for operating said register wheels, a to and fro moving operating handle, a cam operated by said handle and having a dwell for moving said register frame to bring said wheels into gear with said wheel operating devices and for maintaining them in such engagement, a follower for said cam having a trip-off connection with said frame, and means operated on the return stroke of said handle for releasing said trip-off connection.

82. In a computing machine, the combination of a pivoted register frame, register wheels carried by said frame, devices for operating said wheels, operating mechanism including a part having a rocking motion, a cam carried by said part and having a dwell, an arm pivotally connected with said register frame and having or constituting a follower for said cam, a latch connected with said register frame and normally holding said arm in rigid relation with said frame, a pawl carried by said latch, and means acting on said pawl at the beginning of the return stroke of said rocking part to trip said latch.

83. In a computing machine, the combination of a register frame, a series of register wheels mounted in said frame, a series of racks for operating said register wheels, means for setting said racks in accordance with the digits of the number, an operating handle, a device operated by the forward stroke of said handle for restoring said racks, means operated by said handle for moving said register frame to bring the register wheels into and out of gear with said racks, said means including a trip-off connection for disconnecting said frame from said handle in the first part of the return stroke of the handle, and a lost motion connection between said handle and said rack restoring device to delay the restoration of said device to normal position until after said register frame has been tripped off.

84. In a computing machine, the combination of a series of register wheels, a movably mounted register frame in which said wheels are mounted, a series of racks for operating said wheels, said wheels being normally out of gear with said racks, means for setting said racks in accordance with the digits of a number, an operating handle having a to and fro motion, means operated on the forward stroke of said handle for first moving said register frame to bring said wheels into gear with said racks and then restoring said racks and operating said wheels, said rack restoring means including a part that comes to a dead center in the latter part of the forward stroke of the handle, a trip-off connection operated at the beginning of the return stroke of said handle for disconnecting said register frame from said handle, and a lost motion connection between said handle and said rack restoring means to delay the return of said means until the register frame is tripped off.

85. In a computing machine, the combination of a register, settable operating devices for said register normally out of gear with said register, means for bringing said register and its operating devices into gear, numeral keys for controlling the setting of said settable devices, and means for preventing the operation of said keys when said register and its operating devices are in gear.

86. In a computing machine, the combination of a movable register frame, register wheels in said frame, racks for operating said wheels, numeral keys for setting said racks, means for moving said register frame to bring said wheels into and out of gear with said racks, and a device controlled by said register frame for blocking the operation of said keys when said register wheels are in gear with said racks.

87. In a computing machine, the combination of a movable register frame, register wheels in said frame, racks for operating said wheels, keys for controlling the setting of said racks, means for moving said register frame to bring said register wheels into and out of gear with said racks, and means operated by any of said keys to block the motion of said register frame when a key is depressed.

88. In a computing machine, the combination of a pivoted register frame, register wheels in said frame, racks for operating said wheels, keys for setting said racks, means for moving said frame about its pivot to bring said register wheels into and out of gear with said racks, an arm on said register frame, and a second arm operated by said keys, said arms being so related that one of them blocks the motion of the other when either said register frame or one of the keys is out of normal position.

89. In a combined typewriting and computing machine, the combination of typewriting mechanism including printing instrumentalities and printing keys for writing any words and numbers, a register, setting-up devices controlled by the numeral keys of the typewriter for setting up a number to be registered, register operating mechanism for operating said register in accordance with the number set up, and a lock for preventing the operation of said operating mechanism when one of the numeral keys of the typewriter is depressed.

90. In a computing machine, the combination of a series of register wheels, operating devices for turning said register wheels in one direction for addition and in the other direction for subtraction, means for causing said operating devices to set said wheels to zero, and means to insure that said operating devices when controlled by said zero-setting means shall always turn said wheels in the same direction.

91. In a combined typewriting and adding machine, the combination of a computer frame, a computing mechanism therein, a typewriter frame mounted on said computer frame, printing keys in the typewriter frame, and transmitting mechanism between said printing keys and said computing mechanism comprising horizontally reciprocating bars mounted in said typewriter frame and actuated by the numeral keys thereof, and also connections mounted in said computer frame in position to be operated by said horizontally reciprocating bars.

92. The combination of typewriting mechanism including a carriage and letter space feed mechanism therefor, computing mechanism including denomination selecting mechanism, and connections from said carriage to said denomination selecting mechanism, said connections being variable so as to have the same effect on said denomination selecting mechanism whatever the letter space interval of the typewriter carriage may be.

93. The combination of typewriting mechanism including a carriage and letter space feed mechanism therefor, computing mechanism including denomination selecting mechanism, and connections from said carriage to said denomination selecting mechanism, said connections including a part adjustable to maintain the action of said denomination selecting mechanism the same whatever may be the letter space interval of the carriage feed mechanism.

94. The combination of typewriting mechanism including a carriage and letter space feed mechanism therefor, computing mechanism including denomination selecting mechanism, a part of said denomination selecting mechanism having step-by-step feed, and connections between said carriage and said part, said connections including means adjustable to vary the leverage-ratio between said carriage and said step-by-step moving part of the denomination selecting mechanism.

Signed at Grand Rapids, in the county of Kent, and State of Michigan, this fifth day of December, A. D. 1910.

GLENN J. BARRETT.

Witnesses:
CHAS. D. REEVE,
EARL B. NICKLIN.

Copies of this patent may be obtained for five cents each, by addressing the "Commissioner of Patents, Washington, D. C."